US011388762B2

(12) United States Patent
Yao et al.

(10) Patent No.: US 11,388,762 B2
(45) Date of Patent: Jul. 12, 2022

(54) METHOD AND APPARATUS FOR DETERMINING PROTOCOL DATA UNIT SESSION SERVICE NETWORK ELEMENT

(71) Applicant: Huawei Technologies Co., Ltd., Shenzhen (CN)

(72) Inventors: Qi Yao, Shenzhen (CN); Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 16/992,500

(22) Filed: Aug. 13, 2020

(65) Prior Publication Data

US 2020/0374951 A1    Nov. 26, 2020

Related U.S. Application Data

(63) Continuation of application No. PCT/CN2019/075010, filed on Feb. 14, 2019.

(30) Foreign Application Priority Data

Feb. 14, 2018   (CN) .......................... 201810152247.3

(51) Int. Cl.
  *H04W 76/11* (2018.01)
  *H04W 76/12* (2018.01)
  (Continued)

(52) U.S. Cl.
  CPC .............. *H04W 76/11* (2018.02); *G06N 3/08* (2013.01); *H04L 41/16* (2013.01); *H04W 48/16* (2013.01);
  (Continued)

(58) Field of Classification Search
  CPC ..... H04W 76/11; H04W 76/12; H04W 76/15; H04W 48/16; H04W 48/18;
  (Continued)

(56) References Cited

U.S. PATENT DOCUMENTS

2009/0040982 A1    2/2009  Ho et al.
2018/0376445 A1*  12/2018  Yoon .................... H04W 76/30

FOREIGN PATENT DOCUMENTS

CN      104780527 A      7/2015
CN      107027136 A      8/2017
(Continued)

OTHER PUBLICATIONS

3GPP TS 23.502 V15.0.0, "3rd Generation Partnership Project; Technical Specification Group Services and System Aspects; Procedures for the 5G System; Stage 2 (Release 15)," Dec. 2017, 257 pages.

(Continued)

*Primary Examiner* — Diane D Mizrahi
(74) *Attorney, Agent, or Firm* — Conley Rose, P.C.

(57) ABSTRACT

A method and an apparatus for determining a protocol data unit (PDU) session service network element to control an aggregated maximum bit rate (AMBR), where the method includes receiving, by a control plane function network element, a request for establishing a first PDU session from a mobility management device, where the request for establishing the first PDU session includes a first data network name (DNN), determining, by the control plane function network element, that a same control plane function network element and a same user plane function network element need to be selected for a PDU session corresponding to the first DNN, and sending, by the control plane function network element, first indication information to the mobility management device, where the first indication information is used to indicate that a same control plane function network element needs to be selected for the PDU session corresponding to the first DNN.

20 Claims, 10 Drawing Sheets

(51) Int. Cl.
| | |
|---|---|
| *H04W 76/15* | (2018.01) |
| *G06N 3/08* | (2006.01) |
| *H04L 41/16* | (2022.01) |
| *H04W 48/16* | (2009.01) |
| *H04W 48/18* | (2009.01) |
| *H04W 64/00* | (2009.01) |
| *H04W 74/00* | (2009.01) |

(52) U.S. Cl.
CPC ......... *H04W 48/18* (2013.01); *H04W 64/003* (2013.01); *H04W 74/002* (2013.01); *H04W 76/12* (2018.02); *H04W 76/15* (2018.02)

(58) Field of Classification Search
CPC ............. H04W 64/003; H04W 74/002; H04W 36/0022; H04W 88/16; H04W 80/10; G06N 3/08; H04L 41/16
See application file for complete search history.

(56) References Cited

FOREIGN PATENT DOCUMENTS

| CN | 107396401 A | 11/2017 |
|---|---|---|
| CN | 107690161 A | 2/2018 |

OTHER PUBLICATIONS

3GPP TS 23.501 V15.0.0, "3rd Generation Partnership Project; Technical Specification Group Services and System Aspects; System Architecture for the 5G System; Stage 2 (Release 15)," Dec. 2017, 181 pages.
S2-180348, Huawei, "How multiple PDU sessions to same DN are transferred to EPS," SA WG2 Meeting #125, Jan. 22-26, 2018, Gothenburg, Sweden, 5 pages.
S2-177145, Huawei, "Clarification on UE location reporting," SA WG2 Meeting #123, Oct. 23-27, 2017, Ljubljana, Slovenia, 3 pages.
S2-180192, Qualcomm Incorporated, "Clarifying the use of DNNs/APNs for slicing and interworking," SA WG2 Meeting #S2-125, Jan. 22-26, 2018, Gothenburg, Sweden, 2 pages.
Huawei, HiSilicon, TS 23.501: SM subscription data management on slice and DNN granularity [online], 3GPP TSG SA WG2 #124, 3GPP, Dec. 1, 2017, S2-178626,Nov. 27-Dec. 1, 2017, 8 pages.
3GPP TS 23.501 V2.0.0, 3rd Generation Partnership Project;Technical Specification Group Services and System Aspects; System Architecture for the 5G System; Stage 2 (Release 15), 183 pages.
Samsung, "User Plane Selection Criteria," SA WG2 Meeting #118Bis, S2-170178, Jan. 16-20, 2016, 1 page.
3GPP TS 23.501 V1.5.0 (Nov. 2017), "3rd Generation Partnership Project; Technical Specification Group Services and System Aspects; System Architecture for the 5G System; Stage 2 (Release 15)," 170 pages.

* cited by examiner

METHOD AND APPARATUS FOR DETERMINING PROTOCOL DATA UNIT SESSION SERVICE NETWORK ELEMENT

CROSS-REFERENCE TO RELATED APPLICATIONS

This application is a continuation of International Patent Application No. PCT/CN2019/075010 filed on Feb. 14, 2019, which claims priority to Chinese Patent Application No. 201810152247.3 filed on Feb. 14, 2018. The disclosures of the aforementioned applications are hereby incorporated by reference in their entireties.

TECHNICAL FIELD

This application relates to the communications field, and in particular, to a method and an apparatus for determining a protocol data unit (PDU) session service network element in the communications field.

BACKGROUND

With rapid development of wireless communications technologies, a fifth generation (5G) mobile communications technology emerges. In an initial period of network deployment, because 5G network coverage is insufficient, when a location of user equipment (UE) changes, the UE needs to switch a session between a 5G network and a fourth generation (4G) network.

Establishing a packet data network (PDN) connection in a 4G network requires an access point name (APN) parameter, and creating a PDU session in 5G requires a data network name (DNN). The APN in 4G is equivalent to the DNN in 5G.

The UE may establish one or more PDU sessions that use a same DNN in 5G. How to select session management network elements for sessions with a same DNN is not stipulated in the other approaches. Therefore, different session management network elements may be selected for the one or more PDU sessions with the same DNN. In 4G, to control an APN aggregated maximum bit rate (AMBR), it is required that only one session management device can be selected for one or more PDN connections with a same APN. Therefore, the AMBR cannot be controlled when the plurality of PDU sessions that have the same DNN and for which different session management network elements are selected need to be switched to the 4G network.

SUMMARY

This application provides a method and an apparatus for determining a PDU session service network element in order to help control an AMBR.

According to a first aspect, a method for determining a PDU session service network element is provided, including receiving, by a control plane function network element, a request for establishing a first PDU session from a mobility management device, where the request for establishing the first PDU session includes a first DNN, determining, by the control plane function network element, that a same control plane function network element and a same user plane function network element need to be selected for a PDU session corresponding to the first DNN, and sending, by the control plane function network element, first indication information to the mobility management device, where the first indication information is used to indicate that a same control plane function network element needs to be selected for the PDU session corresponding to the first DNN.

In this embodiment of this application, the control plane function network element selects a same control plane function network element and a same user plane function network element for a plurality of PDU sessions corresponding to a same DNN. In this way, when the plurality of PDU sessions having the same DNN are switched from a 5G network to a 4G network, a same control plane function network element and a same user plane function network element may still be selected such that an AMBR can be controlled.

It should be understood that the PDU session corresponding to the first DNN refers to one or more PDU sessions that access a data network indicated by the first DNN. The PDU session corresponding to the first DNN may be one or more PDU sessions that carry the first DNN and that are established by a terminal. Optionally, the PDU session corresponding to the first DNN may be a plurality of PDU sessions that carry the first DNN and that are established by different terminals.

In some implementations, the request for establishing the first PDU session further includes second indication information, and the second indication information is used to indicate that a same control plane function network element and a same user plane function network element need to be selected for the PDU session corresponding to the first DNN that is established by the terminal.

Determining, by the control plane function network element, that a same control plane function network element and a same user plane function network element need to be selected for a PDU session corresponding to the first DNN includes determining, by the control plane function network element according to the second indication information, that a same control plane function network element and a same user plane function network element need to be selected for the PDU session corresponding to the first DNN that is established by the terminal.

That is, in this case, the second indication information indicates, using a terminal as a granularity, that a same control plane function network element and a same user plane function network element need to be selected for the PDU session corresponding to the first DNN that is established by the terminal. In this way, a plurality of PDU sessions with a same DNN that are established by a terminal can be simultaneously switched to the 4G network such that continuity of the PDU sessions of the terminal can be ensured, and an AMBR can be implemented.

In some implementations, the second indication information is session and service continuity (SSC) mode 1.

In some implementations, determining, by the control plane function network element, that a same control plane function network element and a same user plane function network element need to be selected for a PDU session corresponding to the first DNN includes determining, by the control plane function network element according to indication information, that a same control plane function network element and a same user plane function network element need to be selected for the PDU session corresponding to the first DNN, where the indication information is used to indicate that a same control plane function network element and a same user plane function network element need to be selected for the PDU session corresponding to the first DNN. The indication information herein may be the following third indication information or may be fourth indication information.

In some implementations, determining, by the control plane function network element, that a same control plane function network element and a same user plane function network element need to be selected for a PDU session corresponding to the first DNN includes determining, by the control plane function network element according to the third indication information, that a same control plane function network element and a same user plane function network element need to be selected for the PDU session corresponding to the first DNN that is established by the terminal, where the third indication information is used to indicate that a same control plane function network element and a same user plane function network element need to be selected for the PDU session corresponding to the first DNN that is established by the terminal, and the third indication information is from a user data management network element or from a policy management network element.

That is, in this case, the third indication information indicates, using a terminal as a granularity, that a same control plane function network element and a same user plane function network element need to be selected for a PDU session corresponding to the first DNN that is established by the terminal. In this case, the third indication information is from a user data management network element or from a policy management network element.

In some implementations, determining, by the control plane function network element, that a same control plane function network element and a same user plane function network element need to be selected for a PDU session corresponding to the first DNN includes determining, by the control plane function network element according to the fourth indication information, that a same control plane function network element and a same user plane function network element need to be selected for the PDU session corresponding to the first DNN, where the fourth indication information is used to indicate that a same control plane function network element and a same user plane function network element need to be selected for the PDU session corresponding to the first DNN, where the fourth indication information is from a policy management network element or from the control plane function network element.

That is, in this case, the fourth indication information indicates, using a DNN as a granularity, that a same control plane function network element and a same user plane function network element need to be selected for a PDU session corresponding to the first DNN. In this case, the fourth indication information is from the control plane function network element or from a policy management network element. In this case, all PDU sessions having a same DNN can be simultaneously switched to the 4G network. This can improve switching efficiency and implement an AMBR.

In some implementations, before determining, by the control plane function network element, that a same control plane function network element and a same user plane function network element need to be selected for a PDU session corresponding to the first DNN, the method further includes determining, by the control plane function network element, that the first PDU session needs to be subsequently switched to an Evolved Packet Core (EPC) network.

Optionally, the control plane function network element may determine, based on an SSC mode of the first PDU session, whether the first PDU session needs to be subsequently switched to the EPC. If the SSC mode of the first PDU session is mode 1, the control plane function network element determines that the first PDU session needs to be subsequently switched to the EPC. If the SSC mode of the first PDU session is mode 2 or mode 3, the control plane function network element determines that the first PDU session does not need to be subsequently switched to the EPC. SSC modes of PDU sessions corresponding to a same DNN that are established by one terminal are the same. That is, if the first PDU session established by a terminal needs to be subsequently switched to the EPC, another PDU session that carries the first DNN and that is established by the terminal also needs to be subsequently switched to the EPC.

In some implementations, after determining, by the control plane function network element, that a same control plane function network element and a same user plane function network element need to be selected for a PDU session corresponding to the first DNN, the method further includes allocating, by the control plane function network element, a user plane function network element to the first PDU session, and storing a correspondence between the first DNN and the allocated user plane function network element. In this way, when subsequently receiving another PDU session that carries the first DNN, the control plane function network element may select the allocated user plane function network element.

In some implementations, the method further includes receiving, by the control plane function network element, a request for establishing a second PDU session that is sent by the mobility management device, where the request for establishing the second PDU session includes the first DNN, and determining, by the control plane function network element, the user plane function network element for the first PDU session as a user plane function network element for the second PDU session.

In some implementations, the request for establishing the first PDU session further includes first single network slice selection assistance information (S-NSSAI), and the PDU session corresponding to the first DNN is a PDU session that carries the first DNN and the first S-NSSAI. The control plane function network element may determine whether a PDU session that carries the first DNN and the first S-NSSAI has been established. When a PDU session that carries the first DNN and the first S-NSSAI has been established, the user plane function network element selected by the control plane function network element for the first PDU session is a user plane function network element for the established PDU session that has the same first DNN and first S-NSSAI. When no PDU session that carries the first DNN and the first S-NSSAI has been established, the control plane function network element selects a user plane function network element for the first PDU session according to the other approaches.

According to a second aspect, a method for determining a PDU session service network element is provided, including receiving, by a mobility management device, a request for establishing a second PDU session that is sent by a terminal, where the request for establishing the second PDU session includes a first DNN, determining, by the mobility management device based on a first correspondence set, that a first control plane function network element is a control plane function network element for the second PDU session, where the first correspondence set is used to indicate that a same specific control plane function network element needs to be selected for a plurality of PDU sessions that carry a specific DNN, and the first correspondence set includes a correspondence between the first DNN and the first control plane function network element, and sending, by the mobility management device, the request for establishing the second PDU session to the first control plane function network element.

In this embodiment of this application, the mobility management device stores the first correspondence set. When receiving a second PDU session, the mobility management device may query the first correspondence set based on a DNN carried in the second PDU session. When a correspondence related to the DNN carried in the second PDU session is found, it is determined that a specified control plane function network element in the correspondence needs to be selected for the second PDU session. In this way, a same control plane function network element can be selected for PDU sessions having a same DNN.

In some implementations, the method further includes receiving, by the mobility management device, first indication information from the first control plane function network element, where the first indication information is used to indicate that a same control plane function network element needs to be selected for the PDU session corresponding to the first DNN, and storing, by the mobility management device, a correspondence between the first DNN and the first control plane function network element according to the first indication information.

Optionally, the mobility management device may receive first indication information sent by each of a plurality of control plane function network elements in order to form the first correspondence set, and store the first correspondence set.

In some implementations, each element (correspondence) in the first correspondence set is used to indicate a correspondence between one DNN and one control plane function network element and whether a same control plane function network element needs to be selected for PDU sessions corresponding to one DNN.

In some implementations, the request for establishing the second PDU session further includes first S-NSSAI, and the PDU session corresponding to the first DNN is a PDU session that carries the first DNN and the first S-NSSAI.

In some implementations, the first correspondence set is used to indicate that a same specific control plane function network element needs to be selected for a plurality of PDU sessions that carry a specific DNN and specific S-NSSAI, the mobility management device searches the first correspondence set, and when finding a correspondence related to the first DNN and the first S-NSSAI that are carried in the second PDU session, determines that a specified control plane function network element in the correspondence needs to be selected for the second PDU session. In this way, a same control plane function network element can be selected for PDU sessions that have a same DNN and same S-NSSAI. In some implementations, the method further includes receiving, by the mobility management device, first indication information from the first control plane function network element, where the first indication information is used to indicate that a same control plane function network element needs to be selected for a PDU session corresponding to the first DNN and the first S-NSSAI, and storing, by the mobility management device, a correspondence between the first DNN, the S-NSSAI, and the first control plane function network element according to the first indication information.

In some implementations, the request for establishing the second PDU session includes fifth indication information, and the fifth indication information is used to indicate that a same user plane function network element needs to be selected for the PDU session corresponding to the first DNN.

According to a third aspect, a method for determining a PDU session service network element is provided, including receiving, by a mobility management device, a request for establishing a first PDU session that is sent by a terminal, where the request for establishing the first PDU session includes a first DNN, determining, by the mobility management device, that a same control plane function network element needs to be selected or a same control plane function network element and a same user plane function network element need to be selected for a PDU session corresponding to the first DNN, and determining, by the mobility management device, that a first control plane function network element is a control plane function network element for the first PDU session.

In some implementations, the mobility management device determines whether a PDU session with the same DNN has been established, and when a PDU session with the same DNN has been established, determines that the first control plane function network element is a control plane function network element for the established PDU session with the same DNN.

In some implementations, the request for establishing the first PDU session includes second indication information, and the second indication information is used to indicate that a same control plane function network element needs to be selected or a same control plane function network element and a same user plane function network element need to be selected for the PDU session corresponding to the first DNN that is established by the terminal, and determining, by the mobility management device, that a same control plane function network element needs to be selected or a same control plane function network element and a same user plane function network element need to be selected for a PDU session corresponding to the first DNN includes determining, by the mobility management device according to the second indication information, that a same control plane function network element needs to be selected or a same control plane function network element and a same user plane function network element need to be selected for the PDU session corresponding to the first DNN that is established by the terminal.

In some implementations, the second indication information is SSC mode 1.

In some implementations, determining, by the mobility management device, that a same control plane function network element needs to be selected or a same control plane function network element and a same user plane function network element need to be selected for a PDU session corresponding to the first DNN includes determining, by the mobility management device according to third indication information, that a same control plane function network element needs to be selected or a same control plane function network element and a same user plane function network element need to be selected for the PDU session corresponding to the first DNN that is established by the terminal. The third indication information is used to indicate that a same control plane function network element needs to be selected or a same control plane function network element and a same user plane function network element need to be selected for the PDU session corresponding to the first DNN that is established by the terminal, and the third indication information is from a user data management network element or from a policy management network element.

In some implementations, determining, by the mobility management device, that a same control plane function network element needs to be selected or a same control plane function network element and a same user plane function network element need to be selected for a PDU session corresponding to the first DNN includes determining, by the mobility management device according to fourth indication information, that a same control plane function network element needs to be selected or a same control plane function network element and a same user plane function network element need to be selected for the PDU session corresponding to the first DNN. The fourth indication information is used to indicate that a same control plane function network element needs to be selected or a same control plane function network element and a same user plane function network element need to be selected for the PDU session corresponding to the first DNN, and the fourth indication information is from a policy management network element or from a mobility management network element.

In some implementations, if the mobility management device determines that a same control plane function network element and a same user plane function network element need to be selected for the PDU session corresponding to the first DNN, the method further includes sending, by the mobility management device, fifth indication information to the first control plane function network element, where the fifth indication information is used to indicate that the PDU session corresponding to the first DNN corresponds to a same user plane function network element.

In some implementations, the first PDU session is a PDU session that carries the first DNN and that is established by the terminal for the first time, or the first PDU session is a PDU session that carries the first DNN and that is established by the terminal not for the first time.

In some implementations, the request for establishing the first PDU session further includes first S-NSSAI, and the PDU session corresponding to the first DNN is further a PDU session that carries the first DNN and the first S-NSSAI.

In some implementations, the mobility management device determines whether a PDU session that carries the first DNN and the first S-NSSAI has been established, and when a PDU session that carries the first DNN and the first S-NSSAI has been established, determines that the first control plane function network element is a control plane function network element for the established PDU session that has the same first DNN and first S-NSSAI. When no PDU session that carries the first DNN and the first S-NSSAI has been established, the mobility management device selects the first control plane function network element for the first PDU session according to the other approaches.

According to a third aspect, a method for determining a PDU session service network element is provided. The method includes receiving, by a mobility management device, a request for establishing a first PDU session that is sent by a terminal, where the request for establishing the first PDU session includes a first DNN, determining, by the mobility management device, that a same control plane function network element needs to be selected or a same control plane function network element and a same user plane function network element need to be selected for a PDU session corresponding to the first DNN, and determining, by the mobility management device, that a first control plane function network element is a control plane function network element for the first PDU session.

In some implementations, the method further includes determining, by the mobility management device, whether a PDU session with the same first DNN has been established, and when a PDU session with the same first DNN has been established, determining that the first control plane function network element is a control plane function network element for the established PDU session with the same first DNN.

In some implementations, the request for establishing the first PDU session includes second indication information, and the second indication information is used to indicate that a same control plane function network element needs to be selected or a same control plane function network element and a same user plane function network element need to be selected for the PDU session corresponding to the first DNN that is established by the terminal, and determining, by the mobility management device, that a same control plane function network element needs to be selected or a same control plane function network element and a same user plane function network element need to be selected for a PDU session corresponding to the first DNN includes determining, by the mobility management device according to the second indication information, that a same control plane function network element needs to be selected or a same control plane function network element and a same user plane function network element need to be selected for the PDU session corresponding to the first DNN that is established by the terminal.

In some implementations, the second indication information is SSC mode 1.

In some implementations, determining, by the mobility management device, that a same control plane function network element needs to be selected or a same control plane function network element and a same user plane function network element need to be selected for a PDU session corresponding to the first DNN includes determining, by the mobility management device based on a first correspondence set and the first DNN, that a same control plane function network element needs to be selected or a same control plane function network element and a same user plane function network element need to be selected for the PDU session corresponding to the first DNN, where the first correspondence set is used to indicate that a same specific control plane function network element needs to be selected for a plurality of PDU sessions that carry a specific DNN, and the first correspondence set includes a correspondence between the first DNN and the first control plane function network element.

In some implementations, the method further includes receiving, by the mobility management device, first indication information from the first control plane function network element, where the first indication information is used to indicate that a same control plane function network element needs to be selected for the PDU session corresponding to the first DNN, and storing, by the mobility management device, a correspondence between the first DNN and the first control plane function network element according to the first indication information.

In some implementations, if the mobility management device determines that a same control plane function network element and a same user plane function network element need to be selected for the PDU session corresponding to the first DNN, the method further includes sending, by the mobility management device, fifth indication information to the first control plane function network element, where the fifth indication information is used to indicate that a same user plane function network element needs to be selected for the PDU session corresponding to the first DNN.

In some implementations, the request for establishing the first PDU session further includes first S-NSSAI, and the PDU session corresponding to the first DNN is a PDU session that carries the first DNN and the first S-NSSAI.

In some implementations, the method further includes determining, by the mobility management device, whether a PDU session that carries the first DNN and the first S-NSSAI has been established, and when a PDU session that carries the first DNN and the first S-NSSAI has been established, determining that the first control plane function network element is a control plane function network element for the established PDU session that has the same first DNN and first S-NSSAI.

According to a fourth aspect, a method for determining a PDU session service network element is provided, including receiving, by a control plane function network element, a request for establishing a first PDU session that is sent by a mobility management device, where the request for establishing the first PDU session includes a first DNN, determining, by the control plane function network element, that a same user plane function network element needs to be selected for a PDU session corresponding to the first DNN, and determining, by the control plane function network element, that a first user plane function network element is a user plane function network element for the first PDU session.

In some implementations, the method further includes determining, by the control plane function network element, whether a PDU session with the same first DNN has been established, and when a PDU session with the same first DNN has been established, determining that the first user plane function network element is a user plane function network element for the established PDU session with the same first DNN.

In some implementations, the request for establishing the first PDU session includes second indication information, and the second indication information is used to indicate that a same user plane function network element needs to be selected for a PDU session corresponding to the first DNN that is established by a terminal, and determining, by the control plane function network element, that a same user plane function network element needs to be selected for a PDU session corresponding to the first DNN includes determining, by the control plane function network element according to the second indication information, that a same user plane function network element needs to be selected for the PDU session corresponding to the first DNN.

In some implementations, the second indication information is SSC mode 1.

In some implementations, determining, by the control plane function network element, that a same user plane function network element needs to be selected for a PDU session corresponding to the first DNN includes determining, by the control plane function network element according to third indication information, that a same user plane function network element needs to be selected for the PDU session corresponding to the first DNN that is established by the terminal, where the third indication information is used to indicate that a same user plane function network element needs to be selected for the PDU session corresponding to the first DNN that is established by the terminal, and the third indication information is from a user data management network element or from a policy management network element.

In some implementations, determining, by the control plane function network element, that a same user plane function network element needs to be selected for a PDU session corresponding to the first DNN includes determining, by the control plane function network element according to fourth indication information, that a same user plane function network element needs to be selected for the PDU session corresponding to the first DNN, where the fourth indication information is used to indicate that a same user plane function network element needs to be selected for the PDU session corresponding to the first DNN, and the fourth indication information is from a policy management network element or from the control plane function network element.

In some implementations, the request for establishing the first PDU session further includes first S-NSSAI, and the PDU session corresponding to the first DNN is a PDU session that carries the first DNN and the first S-NSSAI.

In some implementations, the method further includes determining, by the control plane function network element, whether a PDU session that carries the first DNN and the first S-NSSAI has been established, and when a PDU session that carries the first DNN and the first S-NSSAI has been established, determining that the first user plane function network element is a user plane function network element for the established PDU session that has the same first DNN and first S-NSSAI.

In some implementations, before determining, by the control plane function network element, that a same user plane function network element need to be selected for a PDU session corresponding to the first DNN, the method further includes determining, by the control plane function network element, that the first PDU session needs to be subsequently switched to an EPC network.

According to a fifth aspect, an apparatus for determining a PDU session service network element is provided, and is configured to perform the method in any one of the first aspect or the possible implementations of the first aspect. Further, the apparatus includes units configured to perform the method in any one of the first aspect or the possible implementations of the first aspect.

According to a sixth aspect, an apparatus for determining a PDU session service network element is provided, and is configured to perform the method in any one of the second aspect or the possible implementations of the second aspect. Further, the apparatus includes units configured to perform the method in any one of the second aspect or the possible implementations of the second aspect.

According to a seventh aspect, an apparatus for determining a PDU session service network element is provided, and is configured to perform the method in any one of the third aspect or the possible implementations of the third aspect. Further, the apparatus includes units configured to perform the method in any one of the third aspect or the possible implementations of the third aspect.

According to an eighth aspect, an apparatus for determining a PDU session service network element is provided, and is configured to perform the method in any one of the fourth aspect or the possible implementations of the fourth aspect. Further, the apparatus includes units configured to perform the method in any one of the fourth aspect or the possible implementations of the fourth aspect.

According to a ninth aspect, an apparatus for determining a PDU session service network element is provided. The apparatus includes a transceiver (which may include a transmitter and a receiver), a memory, and a processor. The transceiver, the memory, and the processor communicate with each other through an internal connection channel. The memory is configured to store an instruction. The processor is configured to execute the instruction stored in the memory, to control the receiver to receive a signal and control the transmitter to send a signal such that the apparatus performs the method in any one of the first aspect or the possible implementations of the first aspect.

According to a tenth aspect, an apparatus for determining a PDU session service network element is provided. The apparatus includes a transceiver (which may include a transmitter and a receiver), a memory, and a processor. The transceiver, the memory, and the processor communicate with each other through an internal connection channel. The memory is configured to store an instruction. The processor is configured to execute the instruction stored in the memory, to control the receiver to receive a signal and control the transmitter to send a signal such that the apparatus performs the method in any one of the second aspect or the possible implementations of the second aspect.

According to an eleventh aspect, an apparatus for determining a PDU session service network element is provided. The apparatus includes a transceiver (which may include a transmitter and a receiver), a memory, and a processor. The transceiver, the memory, and the processor communicate with each other through an internal connection channel. The memory is configured to store an instruction. The processor is configured to execute the instruction stored in the memory, to control the receiver to receive a signal and control the transmitter to send a signal such that the apparatus performs the method in any one of the third aspect or the possible implementations of the third aspect.

According to a twelfth aspect, an apparatus for determining a PDU session service network element is provided. The apparatus includes a transceiver (which may include a transmitter and a receiver), a memory, and a processor. The transceiver, the memory, and the processor communicate with each other through an internal connection channel. The memory is configured to store an instruction. The processor is configured to execute the instruction stored in the memory, to control the receiver to receive a signal and control the transmitter to send a signal such that the apparatus performs the method in any one of the fourth aspect or the possible implementations of the fourth aspect.

According to a thirteenth aspect, a system for determining a PDU session service network element is provided, including the apparatus in the fifth aspect or any optional implementation of the fifth aspect and the apparatus in the sixth aspect or any optional implementation of the sixth aspect. Optionally, the system includes the apparatus in the seventh aspect or any optional implementation of the seventh aspect and the apparatus in the eighth aspect or any optional implementation of the eighth aspect. Optionally, the system includes the apparatus in the ninth aspect or any optional implementation of the ninth aspect and the apparatus in the tenth aspect or any optional implementation of the tenth aspect. Optionally, the system includes the apparatus in the eleventh aspect or any optional implementation of the eleventh aspect and the apparatus in the twelfth aspect or any optional implementation of the twelfth aspect.

According to a fourteenth aspect, a computer readable storage medium is provided. The computer readable storage medium stores an instruction, and when the instruction runs on a computer, the computer is enabled to perform the method in any one of the first aspect or the possible implementations of the first aspect.

According to a fifteenth aspect, a computer readable storage medium is provided. The computer readable storage medium stores an instruction, and when the instruction runs on a computer, the computer is enabled to perform the method in any one of the second aspect or the possible implementations of the second aspect.

According to a sixteenth aspect, a computer readable storage medium is provided. The computer readable storage medium stores an instruction, and when the instruction runs on a computer, the computer is enabled to perform the method in any one of the third aspect or the possible implementations of the third aspect.

According to a seventeenth aspect, a computer readable storage medium is provided. The computer readable storage medium stores an instruction, and when the instruction runs on a computer, the computer is enabled to perform the method in any one of the fourth aspect or the possible implementations of the fourth aspect.

According to an eighteenth aspect, this application provides a computer program product including an instruction. When the computer program product runs on a computer, the computer is enabled to perform the method in any one of the first aspect or the possible implementations of the first aspect.

According to a nineteenth aspect, this application provides a computer program product including an instruction. When the computer program product runs on a computer, the computer is enabled to perform the method in any one of the second aspect or the possible implementations of the second aspect.

According to a twentieth aspect, this application provides a computer program product including an instruction. When the computer program product runs on a computer, the computer is enabled to perform the method in any one of the third aspect or the possible implementations of the third aspect.

According to a twenty-first aspect, this application provides a computer program product including an instruction. When the computer program product runs on a computer, the computer is enabled to perform the method in any one of the fourth aspect or the possible implementations of the fourth aspect.

According to a twenty-second aspect, this application provides a chip for determining a PDU session service network element. The chip stores an instruction, and when the instruction runs on a control plane function network element or a mobility management device, the control plane function network element or the mobility management device is enabled to perform any method in the foregoing aspects.

DESCRIPTION OF EMBODIMENTS

For ease of understanding the technical solutions in the embodiments of this application, the following first briefly describes technologies related to this application.

Figure 1:
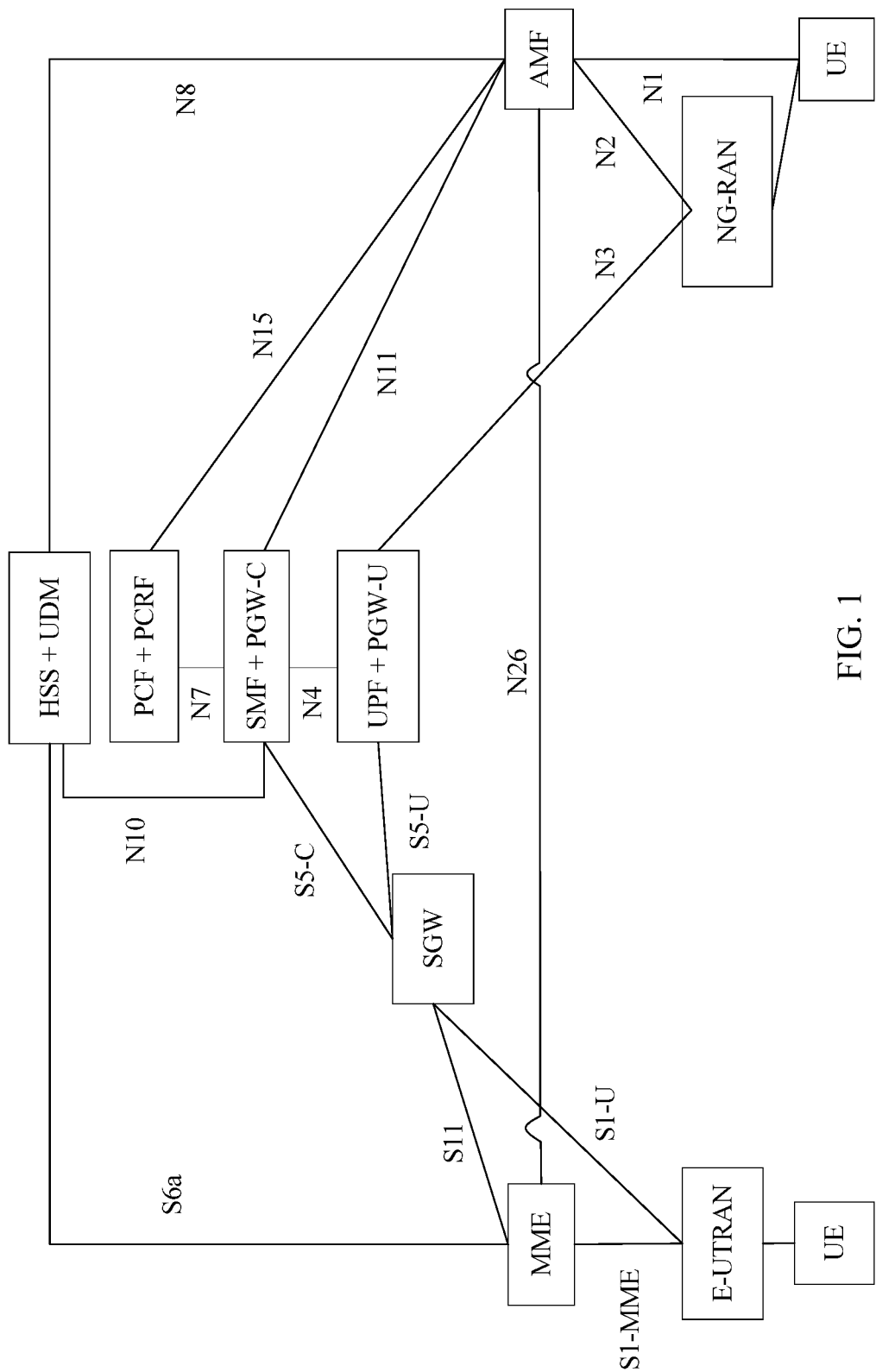
FIG. 1 is a schematic diagram of an architecture system that implements interworking between a 4G network and a 5G network according to an embodiment of this application.

The embodiments of the present disclosure provide a mobility management method, which may be applied to an architecture system 100 that implements interworking between a 4G network and a 5G network shown in FIG. 1. As shown in FIG. 1, the architecture system 100 includes a user plane function (UPF) entity+a PDN Gateway (PGW) user plane function (PGW-U) entity, a session management function (SMF) entity+a PGW control plane function (PGW-C) entity, a policy control function (PCF) entity+a policy and charging rules function (PCRF) entity, a home subscriber server (HSS)+a unified data management (UDM) entity that are shared by the 4G network and the 5G network. Herein, "+" indicates an integrated configuration. The UPF is a user plane function of the 5G network, and the PGW-U is a gateway user plane function of the 4G network corresponding to the UPF. The SMF is a session management function of the 5G network, and the PGW-C is a gateway control plane function of the 4G network corresponding to the SMF. The PCF is a policy control function of the 5G network, and the PCRF is a policy and charging rules function of the 4G network corresponding to the PCF. The "integrated configuration" herein means that a same device has functions of two entities. In the embodiments of this application, for ease of description, the HSS+the UDM entity are referred to as a user data management network element, the PGW-C entity+the SMF entity are referred to as a control plane function network element, and the UPF entity+the PGW-U entity are referred to as a user plane function network element. This is centrally described herein, and not described again below. Certainly, the foregoing network devices obtained through integrated configuration may also use other names. This is not further limited in the embodiments of this application.

In addition, as shown in FIG. 1, the foregoing architecture that implements interworking between a 4G network and a 5G network may further include a Mobility Management Entity (MME), a Serving Gateway (SGW), and an access and mobility management function (AMF) entity that is in the 5G network. A terminal accesses the 4G network using an Evolved Universal Terrestrial Radio Access Network (E-UTRAN) device, and a terminal accesses the 5G network using a Next Generation Radio Access Network (NG-RAN) device. The E-UTRAN device communicates with the MME using an S1-MME interface, the E-UTRAN device communicates with the SGW using an S1-U interface, the MME communicates with the SGW using an S11 interface, the MME communicates with the user data management network element using an S6a interface, the MME communicates with the AMF entity using an N26 interface, the SGW communicates with the PGW-U entity+the UPF entity using an S5-U interface, the SGW communicates with the PGW-C entity+the SMF entity using an S5-C interface, the PGW-U entity+the UPF entity communicate with the NG-RAN device using an N3 interface, the PGW-U entity+the UPF entity communicate with the PGW-C entity+the SMF entity using an N4 interface, the PGW-C entity+the SMF entity communicate with the PCRF entity+the PCF entity using an N7 interface, the HSS+the UDM entity communicate with the PGW-C entity+the SMF entity using an N10 interface, the HSS+the UDM entity communicate with the AMF entity using an N8 interface, the PCRF entity+the PCF entity communicate with the AMF entity using an N15 interface, the PGW-C entity+the SMF entity communicate with the AMF entity using an N11 interface, the AMF entity communicates with the NG-RAN device using an N2 interface, and the AMF entity communicates with the terminal using an N1 interface. In the foregoing interworking architecture, the N26 interface between the MME and the AMF may not exist in some scenarios, and the N26 interface may be used in a terminal context transfer and handover process. This application separately describes related possible implementations for a scenario in which the N26 interface exists between the MME and the AMF and for a scenario in which the N26 interface does not exist between the MME and the AMF.

It should be noted that, that a terminal is UE is merely used as an example in FIG. 1, and names of the interfaces between network elements in FIG. 1 are merely examples. In specific implementation, the interface names may be other names, and this is not limited in the embodiments of this application.

It should be noted that the NG-RAN device in the 5G network may also be referred to as an access device. The access device is a device that accesses a core network, and may be, for example, a base station, a Broadband Network Gateway (BNG), an aggregation switch, or a non-3rd Generation Partnership Project (non-3GPP) access device. The base station may include various types of base stations, for example, a macro base station, a micro base station (also referred to as a small cell), a relay station, and an access point. This is not further limited in the embodiments of this application.

Certainly, there may be other network elements in the 4G network and the 5G network. For example, the 4G network may further include a Serving General Packet Radio Service (GPRS) Support Node (SGSN), and the 5G network may further include an authentication server function (AUSF) entity and a network slice selection function (NSSF) entity. This is not limited in the embodiments of this application.

The terminal mentioned in the embodiments of this application may include various handheld devices, in-vehicle devices, wearable devices, computing devices, or other processing devices connected to a wireless modem that have a wireless communication function. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, UE, a mobile station (MS), a terminal device), and the like. For ease of description, in this application, the devices mentioned above are collectively referred to as terminals.

APN:

In the 4G network, the terminal may provide an APN for the MME when initiating a packet service. The MME performs domain name resolution using a domain name server (DNS) based on the APN provided by the terminal in order to obtain an address (for example, an Internet Protocol (IP) address) of a session management network element, and connect the terminal to a PDN corresponding to the APN.

DNN:

In the 5G network, the terminal may provide S-NSSAI and a DNN for the AMF when initiating PDU session establishment. The AMF determines an address of a session management network element based on the S-NSSAI, the DNN, and other information (such as subscription information of the terminal and a local operator policy). The determined session management network element establishes a PDU session for the terminal based on the S-NSSAI and the DNN.

An APN in the 4G network is equivalent to a DNN in the 5G network. To control an AMBR, in the embodiments of this application, a same control plane function network element and a same user plane function network element may be selected for PDU sessions corresponding to a same DNN. When a PDU session needs to be switched from the 5G network to the 4G network, continuity of the PDU session can be ensured, and the AMBR can be controlled.

With reference to the accompanying drawings, the following describes in detail a method for determining a PDU session service network element according to the embodiments of this application.

In the embodiments of this application, in a possible application scenario, a same control plane function network element, or a same control plane function network element and a same user plane function network element may be selected for a PDU session corresponding to a first DNN. In another possible application scenario, a PDU session corresponding to a first DNN may be limited to a PDU session that has a same DNN and same S-NSSAI, that is, a same control plane function network element, or a same control plane function network element and a same user plane function network element may be selected for a PDU session that has a same DNN and same S-NSSAI. For ease of description, only that a same control plane function network element and a same user plane function network element may be selected for a PDU session corresponding to a first DNN is used as an example for description. That a same control plane function network element, or a same control plane function network element and a same user plane function network element may be selected for a PDU session that has a same DNN and same S-NSSAI is similar to that a same control plane function network element and a same user plane function network element may be selected for a PDU session corresponding to a first DNN. To avoid repetition, details are not described herein.

Figure 2:
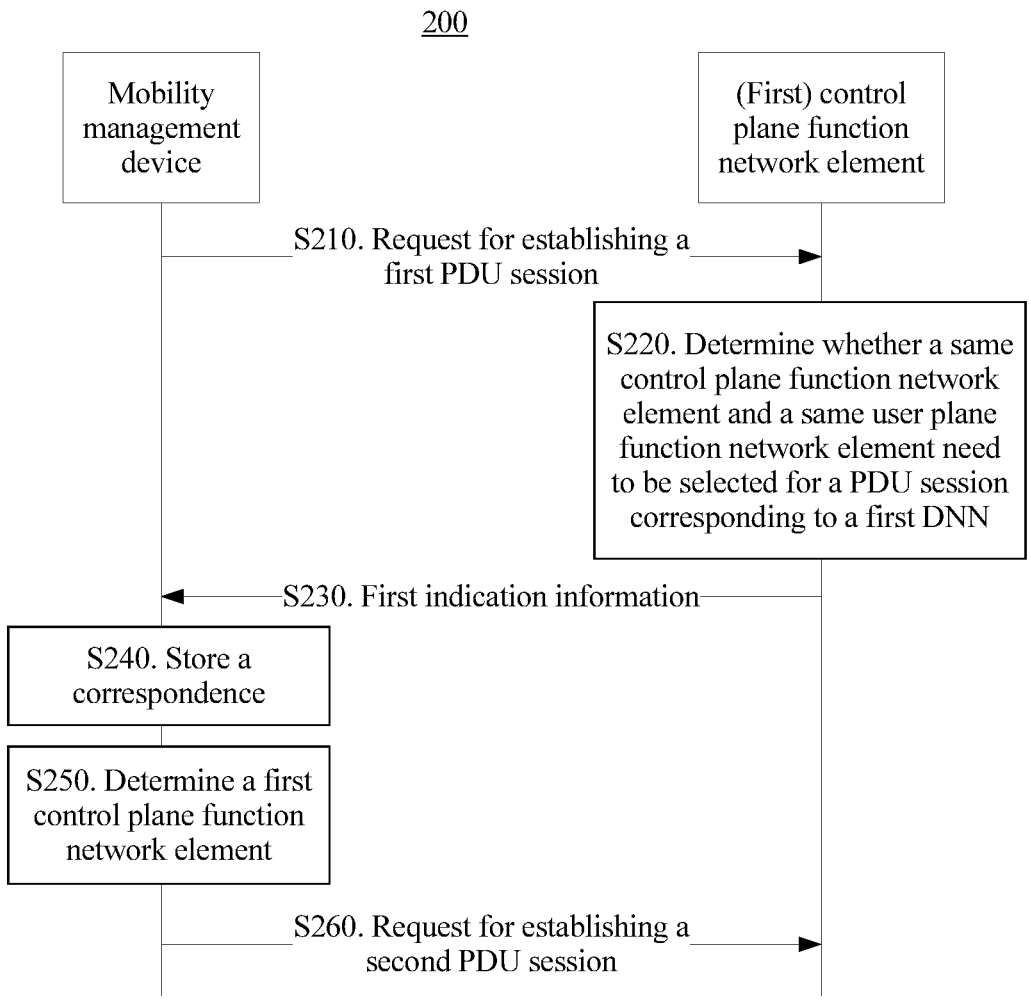
FIG. 2 is a schematic diagram of a method for determining a PDU session service network element according to an embodiment of this application.

FIG. 2 shows a method for determining a PDU session service network element according to an embodiment of this application. The method 200 includes the following steps.

S210. A control plane function network element receives a request for establishing a first PDU session from a mobility management device, where the request for establishing the first PDU session includes a first DNN. Optionally, the request for establishing the first PDU session may further include at least one of the following: an SSC mode of the first PDU session, a session identifier of the first PDU session, S-NSSAI) corresponding to the first PDU session, and a terminal identifier of a terminal that initiates the first PDU session.

S220. The control plane function network element determines that a same control plane function network element and a same user plane function network element need to be selected for a PDU session corresponding to the first DNN.

It should be understood that the PDU session corresponding to the first DNN refers to one or more PDU sessions that access a data network indicated by the first DNN. It should also be understood that the PDU session corresponding to the first DNN may be one or more PDU sessions initiated by one terminal, or may be one or more PDU sessions initiated by different terminals. This is not limited in this embodiment of this application.

In an optional embodiment, after S210 and before S220, the method 200 further includes determining, by the control plane function network element, that the first PDU session needs to be subsequently switched to an EPC network. When the first PDU session needs to be subsequently switched to the EPC, the control plane function network element further determines whether a same control plane function network element and a same user plane function network element need to be selected for the PDU session corresponding to the first DNN. When the first PDU session does not need to be subsequently switched to the EPC, the control plane function network element may further select a user plane function network element for the first PDU session according to the other approaches.

In a possible implementation, the control plane function network element may determine, based on an SSC mode in a request for establishing a PDU session, whether the PDU session needs to be subsequently switched to the EPC. Further, when an SSC mode carried in a PDU session is SSC mode 1, the control plane function network element may determine that the PDU session needs to be subsequently switched to the EPC, or when an SSC mode carried in a PDU session is SSC mode 2 or SSC mode 3, the control plane function network element may determine that the PDU session does not need to be subsequently switched to the EPC.

It may be assumed that a plurality of PDU sessions that are initiated by a same terminal and that carry a same DNN have a same SSC mode, and the control plane function network element may determine, based on the SSC mode, whether the PDU sessions need to be subsequently switched to the EPC. For example, if SSC modes of a plurality of PDU sessions that are initiated by a terminal and that carry the first DNN are all mode 1, the control plane function network element may determine that the PDU sessions corresponding to the first DNN need to be subsequently switched to the EPC, or when SSC modes of a plurality of PDU sessions that carry the first DNN are mode 2 or mode 3, the control plane function network element determines that the plurality of PDU sessions that carry the first DNN do not need to be switched to the EPC. The plurality of PDU sessions that carry the first DNN include the first PDU session.

In an optional embodiment, it may be assumed that a plurality of PDU sessions that are initiated by a same terminal and that carry a same DNN may have different S-NSSAI, that is, the terminal may access a data network using different network slices (or network slice instances). In this scenario, the PDU session corresponding to the first DNN in S220 may be further limited to a PDU session that has a same DNN and same S-NSSAI. The control plane function network element may select a same control plane function network element and a same user plane function network element for a PDU session that is initiated by a terminal and that has a same DNN and same S-NSSAI.

In S220, one or more of the following three manners may be used to determine that a same control plane function network element and a same user plane function network element need to be selected for the PDU session corresponding to the first DNN.

In a first manner, the request for establishing the first PDU session further includes second indication information, and the second indication information is used to indicate that a same control plane function network element and a same user plane function network element need to be selected for a PDU session corresponding to the first DNN that is established by a terminal. S220 includes determining, by the control plane function network element according to the second indication information, that a same control plane function network element and a same user plane function network element need to be selected for the PDU session corresponding to the first DNN that is established by the terminal. In the first manner, there are two possible cases. In a first case, the mobility management device determines that a same control plane function network element and a same user plane function network element need to be selected for the PDU session corresponding to the first DNN that is established by the terminal. For example, when an SSC mode of the first PDU session is mode 1, the mobility management device may determine that a same control plane function network element and a same user plane function network element need to be selected for the PDU session corresponding to the first DNN that is established by the terminal, and then the mobility management device sends the second indication information to the control plane function network element to indicate that a same control plane function network element and a same user plane function network element need to be selected for the PDU session corresponding to the first DNN that is established by the terminal. In a second case, the mobility management device directly sends the second indication information to the control plane function network element. In this case, the second indication information indicates that the SSC of the first PDU session is SSC mode 1. That is, in this case, the mobility management device forwards SSC mode 1 in the request for establishing the first PDU session to the control plane function network element. After receiving the request for establishing the first PDU session, the control plane function network element determines, based on SSC mode 1 carried in the request for establishing the first PDU session, that a same control plane function network element and a same user plane function network element need to be selected for the PDU session corresponding to the first DNN that is established by the terminal.

In a second manner, S220 includes determining, by the control plane function network element according to third indication information, that a same control plane function network element and a same user plane function network element need to be selected for a PDU session corresponding to the first DNN that is established by a terminal, where the third indication information is used to indicate that a same control plane function network element and a same user plane function network element need to be selected for the PDU session corresponding to the first DNN that is established by the terminal, and the third indication information is from a user data management network element or from a policy management network element.

That is, the third indication information used to indicate that a same control plane function network element and a same user plane function network element need to be selected for the PDU session corresponding to the first DNN that is established by the terminal may be from UDM or a PCF. The third indication information may be from subscription data of the UDM. For example, the third indication information from the subscription data of the UDM indicates that a same control plane function network element and a same user plane function network element need to be selected for the PDU session corresponding to the first DNN that is initiated by the terminal. Alternatively, the third indication information may be from a policy rule of the first DNN of the PCF.

In a third manner, S220 includes determining, by the control plane function network element according to fourth indication information, that a same control plane function network element and a same user plane function network element need to be selected for the PDU session corresponding to the first DNN, where the fourth indication information is used to indicate that a same control plane function network element and a same user plane function network element need to be selected for the PDU session corresponding to the first DNN, and the fourth indication information is from a policy management network element or from the control plane function network element.

That is, the fourth indication information used to indicate that a same control plane function network element and a same user plane function network element need to be selected for the PDU session corresponding to the first DNN may be from a PCF or may be from the control plane function network element, that is, the control plane function network element locally configures a DNN-related rule. For example, the control plane function network element configures that a same control plane function network element and a same user plane function network element need to be selected for PDU sessions corresponding to some specific DNNs, and that there is no need to select a same control plane function network element and a same user plane function network element for PDU sessions corresponding to some other specific DNNs.

A difference between the second manner and the third manner is as follows. The third indication information in the second manner indicates that a same control plane function network element and a user plane function network element need to be selected for the PDU session corresponding to the first DNN that is established by the terminal, and the fourth indication information in the third manner indicates that a same control plane function network element and a same user plane function network element need to be selected for the PDU session corresponding to the first DNN. That is, the third indication information uses a terminal as a granularity, and the fourth indication information uses the first DNN as a granularity. The PDU session corresponding to the first DNN may include a PDU session corresponding to the first DNN that is established by one or more terminals. Different granularities indicate different sources of indication information. When a terminal is used as a granularity, the third indication information is from the UDM or the PCF. When a DNN is used as a granularity, the fourth indication information is from the PCF or the control plane function network element.

The foregoing describes how the control plane function network element determines that a same control plane function network element and a same user plane function network element need to be selected for the PDU session corresponding to the first DNN. In a possible implementation, the request for establishing the first PDU session includes the first DNN and first S-NSSAI. The following two manners describe how the control plane function network element determines that a same control plane function network element and a same user plane function network element need to be selected for a PDU session that carries the first DNN and the first S-NSSAI.

In a first manner, the control plane function network element determines, according to third indication information, that a same control plane function network element and a same user plane function network element need to be selected for a PDU session that carries the first DNN and the first S-NSSAI, where the third indication information is used to indicate that a same control plane function network element and a same user plane function network element need to be selected for the PDU session that carries the first DNN and the first S-NSSAI and that is initiated by a terminal. The third indication information may be from subscription data in a user data management network element, and the subscription data may indicate that a same control plane function network element and a same user plane function network element need to be selected for the PDU session that carries the first DNN and the first S-NSSAI and that is initiated by the terminal.

In a second manner, the control plane function network element determines, according to fourth indication information, that a same control plane function network element and a same user plane function network element need to be selected for a PDU session that carries the first DNN and the first S-NSSAI, where the fourth indication information is used to indicate that a same control plane function network element and a same user plane function network element need to be selected for the PDU session corresponding to the first DNN, and the fourth indication information is from a policy management network element or from the control plane function network element.

That is, the fourth indication information used to indicate that a same control plane function network element and a same user plane function network element need to be selected for the PDU session that carries the first DNN and the first S-NSSAI may be from a PCF or may be from the control plane function network element, that is, the control plane function network element locally configures a rule related to a DNN and S-NSSAI. For example, the control plane function network element configures that a same control plane function network element and a same user plane function network element need to be selected for PDU sessions that carry some specific DNNs and specific S-NSSAI, and that there is no need to select a same control plane function network element and a same user plane function network element for PDU sessions that carry some other specific DNNs and other S-NSSAI.

A difference between the second manner and the third manner is as follows. The third indication information in the second manner indicates that a same control plane function network element and a same user plane function network element need to be selected for the PDU session that carries the first DNN and the first S-NSSAI and that is initiated by the terminal, and the fourth indication information in the third manner indicates that a same control plane function network element and a same user plane function network element need to be selected for the PDU session that carries the first DNN and the first S-NSSAI. That is, the third indication information uses a PDU session that has a same DNN and same S-NSSAI and that is initiated by a terminal as a granularity, and the fourth indication information uses a PDU session that has a same DNN and same S-NSSAI as a granularity, regardless of whether the PDU session is initiated by a same terminal. In this case, the PDU session that carries the first DNN and the first S-NSSAI may include a PDU session corresponding to the first DNN that is established by one or more terminals. Different granularities indicate different sources of indication information. When a PDU session that has a same DNN and same S-NSSAI and that is initiated by a terminal is used as a granularity, the third indication information is from UDM or the PCF. When a PDU session that has a same DNN and same S-NSSAI is used as a granularity, the fourth indication information is from the PCF or the control plane function network element.

It should be understood that the second indication information, the third indication information, and the fourth indication information indicate that a same control plane function network element and a same user plane function network element need to be selected for the PDU session corresponding to the first DNN (or the PDU session that carries the first DNN and the first S-NSSAI). In S220, the control plane function network element may determine, according to at least one of the second indication information, the third indication information, and the fourth indication information, that a same control plane function network element and a same user plane function network element need to be selected for the PDU session corresponding to the first DNN (or the PDU session that carries the first DNN and the first S-NSSAI). That is, only an affirmative case is described above. In actual application, the second indication information, the third indication information, and the fourth indication information indicate whether a same control plane function network element and a same user plane function network element need to be selected for the PDU session corresponding to the first DNN (or the PDU session that carries the first DNN and the first S-NSSAI). When the second indication information, the third indication information, and the fourth indication information indicate that there is no need to select a same control plane function network element and a same user plane function network element for the PDU session corresponding to the first DNN (or the PDU session that carries the first DNN and the first S-NSSAI), the control plane function network element may determine, according to at least one of the second indication information, the third indication information, and the fourth indication information, that there is no need to select a same control plane function network element and a same user plane function network element for the PDU session corresponding to the first DNN (or the PDU session that carries the first DNN and the first S-NSSAI), and the control plane function network element does not perform subsequent steps in this embodiment of this application.

After S220, the control plane function network element determines the control plane function network element itself as a control plane function network element for the PDU session corresponding to the first DNN (or the PDU session that carries the first DNN and the first S-NSSAI), and the control plane function network element allocates a user plane function network element to the first PDU session, and stores a correspondence between the first DNN (or the first DNN and the first S-NSSAI) and the allocated user plane function network element. For example, the control plane function network element may allocate the user plane function network element to the first PDU session based on locations of user plane function network elements, load of user plane function network elements, or the like in a current network topology. The user plane function network element allocated to the first PDU session is a user plane function network element allocated to the PDU session corresponding to the first DNN (or the PDU session that carries the first DNN and the first S-NSSAI).

It should be understood that the correspondence between the first DNN (or the first DNN and the first S-NSSAI) and the allocated user plane function network element may be stored in a context of a terminal, or may be separately stored. A manner of storing the correspondence is not limited in this embodiment of this application.

In an optional embodiment, the control plane function network element receives a request for establishing a second PDU session that is sent by the mobility management device, where the request for establishing the second PDU session includes the first DNN, and the control plane function network element determines the user plane function network element for the first PDU session as a user plane function network element for the second PDU session. Further, when the control plane function network element receives the request for establishing the second PDU session, and a DNN carried in the request for establishing the second PDU session is the same as the first DNN, the control plane function network element may use the user plane function network element allocated to the first PDU session as the user plane function network element for the second PDU session.

In an optional embodiment, if the request for establishing the second PDU session includes the first DNN and the first S-NSSAI, and the control plane function network element stores the correspondence between the first DNN and the first S-NSSAI, and the allocated user plane function network element, the control plane function network element determines the user plane function network element for the first PDU session as a user plane function network element for the second PDU session.

In an optional embodiment, the request for establishing the second PDU session includes fifth indication information, and the fifth indication information is used to indicate that a same user plane function network element needs to be selected for the PDU session corresponding to the first DNN (or the PDU session that carries the first DNN and the first S-NSSAI).

That the control plane function network element determines the user plane function network element for the first PDU session as a user plane function network element for the second PDU session includes determining, by the control plane function network element, the user plane function network element for the first PDU session in the context of the terminal according to the fifth indication information, and determining, by the control plane function network element, the user plane function network element for the first PDU session as the user plane function network element for the second PDU session.

In an optional embodiment, that the control plane function network element determines the user plane function network element for the first PDU session as a user plane function network element for the second PDU session includes determining, by the control plane function network element, the user plane function network element for the first PDU session based on the first DNN and the correspondence (the first DNN corresponds to the user plane function network element for the first PDU session), or determining, by the control plane function network element, the user plane function network element for the first PDU session based on the first DNN, the first S-NSSAI, and the correspondence (the first DNN and the first S-NSSAI correspond to the user plane function network element for the first PDU session), and determining, by the control plane function network element, according to the fifth indication information, the user plane function network element for the first PDU session as the user plane function network element for the second PDU session.

S230. The control plane function network element sends first indication information to the mobility management device, where the first indication information is used to indicate that a same control plane function network element needs to be selected for the PDU session corresponding to the first DNN (or the PDU session that carries the first DNN and the first S-NSSAI).

S240. The mobility management device receives the first indication information from the control plane function network element, and the mobility management device stores a correspondence between the first DNN and the control plane function network element according to the first indication information, or stores a correspondence between the first DNN, the first S-NSSAI, and the control plane function network element.

The mobility management device may receive first indication information sent by N control plane function network elements. In this way, the mobility management device may store correspondences between N DNNs and the N control plane function network elements according to the first indication information sent by the N control plane function network elements, to form a first correspondence set, or store one-to-one correspondences between N DNNs, N pieces of S-NSSAI, and the N control plane function network elements, to form a first correspondence set, where N is a positive integer.

S250. The mobility management device determines, based on the first correspondence set, that a first control plane function network element is a control plane function network element for the second PDU session. The first correspondence set is used to indicate that a same specific control plane function network element needs to be selected when the mobility management device receives a request for establishing a plurality of PDU sessions that carry a specific DNN, and the first correspondence set includes a correspondence between the first DNN and the first control plane function network element. To be specific, the first correspondence set includes one or more elements, each element is a correspondence between a DNN and a control plane function network element, and when receiving a request for establishing any PDU session that carries a DNN, the mobility management device needs to select a control plane function network element corresponding to the DNN. Alternatively, the first correspondence set is used to indicate that a same specific control plane function network element needs to be selected for a plurality of PDU sessions that carry a specific DNN and specific S-NSSAI. The mobility management device searches the first correspondence set, and when finding a correspondence related to the first DNN and the first S-NSSAI that are carried in the second PDU session, determines that a specified control plane function network element in the correspondence needs to be selected for the second PDU session. In this way, a same control plane function network element can be selected for PDU sessions that have a same DNN and same S-NSSAI.

S260. The mobility management device sends the request for establishing the second PDU session to the first control plane function network element.

Optionally, the request for establishing the second PDU session carries the first DNN. Alternatively, the request for establishing the second PDU session carries the first DNN and the first S-NSSAI.

Therefore, in this embodiment of this application, the control plane function network element may determine that a same control plane function network element and a same user plane function network element need to be selected for a PDU session corresponding to a same DNN (a PDU session that carries a same DNN and same S-NSSAI). In this way, when switching from a 5G network to a 4G network is performed, a same control plane function network element and a same user plane function network element may still be selected such that an AMBR can be controlled.

The foregoing describes how the control plane function network element determines that a same control plane function network element and a same user plane function network element need to be selected for the PDU session corresponding to the first DNN (or the PDU session that carries the first DNN and the first S-NSSAI). The following describes how the mobility management device determines that a same control plane function network element needs to be selected or a same control plane function network element and a same user plane function network element need to be selected for the PDU session corresponding to the first DNN (or the PDU session that carries the first DNN and the first S-NSSAI). A manner of determining the mobility management network element is similar to the manner of determining the control plane function network element. The following gives a brief description. Likewise, in a method 300, a PDU session corresponding to a first DNN may be replaced with a PDU session that carries the first DNN and first S-NSSAI. In the method 300, only the PDU session corresponding to the first DNN is used as an example for description.

Figure 3:
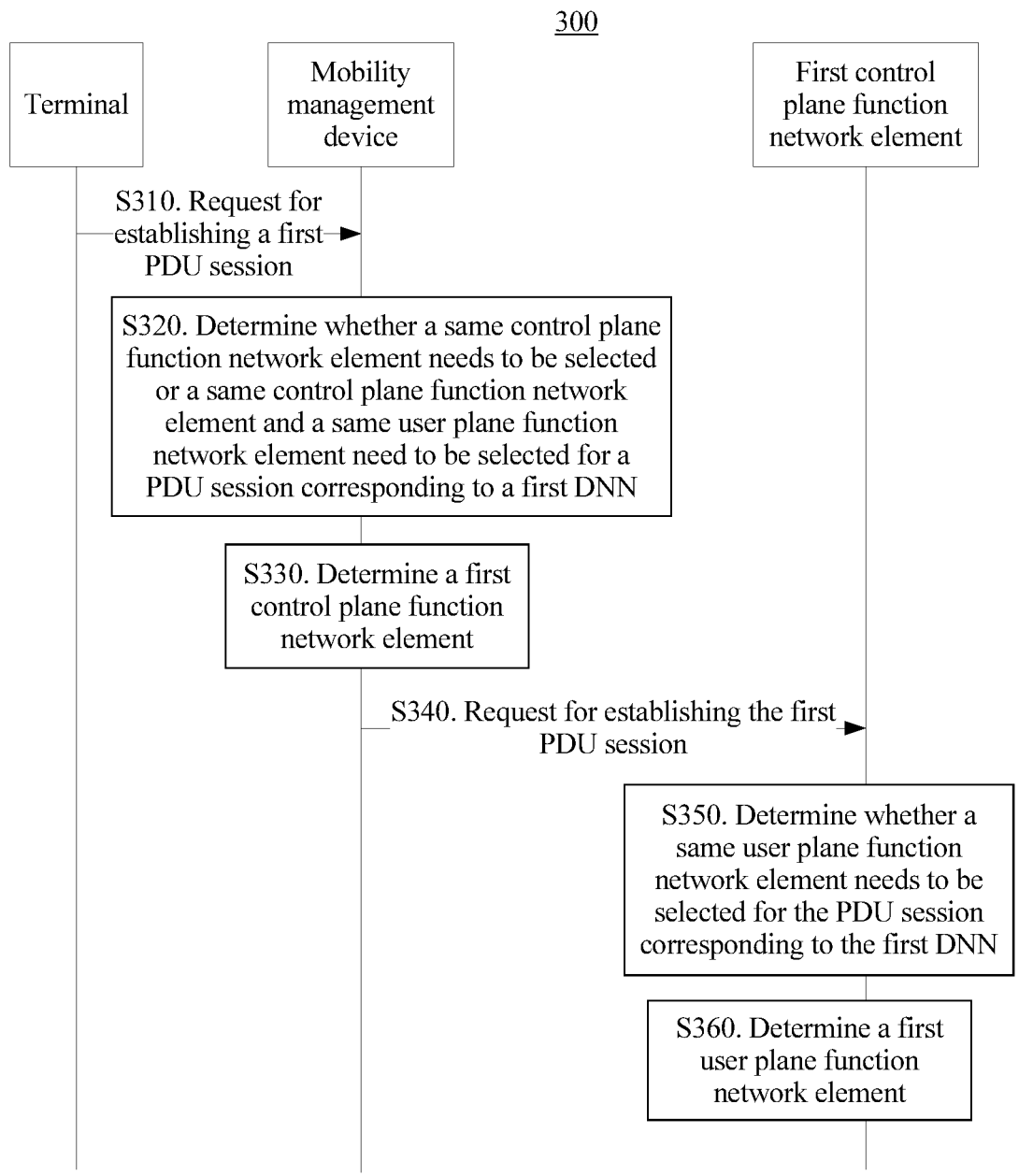
FIG. 3 is a schematic diagram of another method for determining a PDU session service network element according to an embodiment of this application.

FIG. 3 shows the method 300 for determining a PDU session service network element according to an embodiment of this application. The method 300 includes the following steps.

S310. A mobility management device receives a request for establishing a first PDU session that is sent by a terminal, where the request for establishing the first PDU session includes a first DNN.

Optionally, the request for establishing the first PDU session may further include at least one of the following: an SSC mode of the first PDU session, a session identifier of the first PDU session, S-NSSAI corresponding to the first PDU session, and a terminal identifier of the terminal that initiates the first PDU session.

S320. The mobility management device determines that a same control plane function network element needs to be selected for a PDU session corresponding to the first DNN.

Alternatively, S320 may be that the mobility management device determines that a same control plane function network element and a same user plane function network element need to be selected for a PDU session corresponding to the first DNN.

In S320, one or more of the following three manners may be used to determine that a same control plane function network element needs to be selected for the PDU session corresponding to the first DNN.

In a first manner, the request for establishing the first PDU session further includes second indication information, and the second indication information is used to indicate that a same control plane function network element needs to be selected for a PDU session corresponding to the first DNN that is established by the terminal. S320 includes determining, by the mobility management device according to the second indication information, that a same control plane function network element needs to be selected for the PDU session corresponding to the first DNN that is established by the terminal.

In the first manner, there are two possible cases. In a first case, the mobility management device determines that a same control plane function network element needs to be selected for the PDU session corresponding to the first DNN that is established by the terminal. For example, when the SSC mode of the first PDU session is mode 1, the mobility management device may determine that a same control plane function network element needs to be selected for the PDU session corresponding to the first DNN that is established by the terminal, and then the mobility management device sends the second indication information to a control plane function network element to indicate that a same control plane function network element and a same user plane function network element need to be selected for the PDU session corresponding to the first DNN that is established by the terminal. In a second case, the mobility management device directly sends the second indication information to a control plane function network element. In this case, the second indication information indicates that the SSC of the first PDU session is SSC mode 1. That is, in this case, the mobility management device forwards SSC mode 1 in the request for establishing the first PDU session to the control plane function network element. After receiving the request for establishing the first PDU session, the control plane function network element determines, based on SSC mode 1 carried in the request for establishing the first PDU session, that a same control plane function network element and a same user plane function network element need to be selected for the PDU session corresponding to the first DNN that is established by the terminal.

In a second manner, S320 includes determining, by the mobility management device according to third indication information, that a same control plane function network element needs to be selected for the PDU session corresponding to the first DNN that is established by the terminal. The third indication information is used to indicate that a same control plane function network element needs to be selected for the PDU session corresponding to the first DNN that is established by the terminal, and the third indication information is from a user data management network element or from a policy management network element.

That is, the third indication information used to indicate that a same control plane function network element needs to be selected for the PDU session corresponding to the first DNN that is established by the terminal may be from UDM or a PCF. For example, the third indication information may be from subscription data of the UDM. For example, the third indication information from the subscription data of the UDM indicates that a same control plane function network element needs to be selected for the PDU session corresponding to the first DNN that is initiated by the terminal. Alternatively, the third indication information may be from a policy rule of the first DNN of the PCF.

In a third manner, S320 includes determining, by the mobility management device according to fourth indication information, that a same control plane function network element needs to be selected for a PDU session corresponding to the first DNN. The fourth indication information is used to indicate that a same control plane function network element needs to be selected for the PDU session corresponding to the first DNN, and the fourth indication information is from a policy management network element or from the mobility management network element.

That is, the fourth indication information used to indicate that a same control plane function network element needs to be selected for the PDU session corresponding to the first DNN may be from a PCF or may be from the mobility management device, that is, the mobility management device locally configures a DNN-related rule. For example, a same control plane function network element needs to be selected for PDU sessions corresponding to some specific DNNs, and there is no need to select a same control plane function network element for PDU sessions corresponding to some other specific DNNs.

A difference between the second manner and the third manner is as follows. The third indication information in the second manner indicates that a same control plane function network element needs to be selected for the PDU session corresponding to the first DNN that is established by the terminal, and the fourth indication information in the third manner indicates that a same control plane function network element needs to be selected for the PDU session corresponding to the first DNN. That is, the third indication information uses a terminal as a granularity, and the fourth indication information uses the first DNN as a granularity. The PDU session corresponding to the first DNN may include a PDU session corresponding to the first DNN that is established by one or more terminals. Different granularities indicate different sources of indication information. When a terminal is used as a granularity, the third indication information is from the UDM or the PCF. When a DNN is used as a granularity, the fourth indication information is from the PCF or the mobility management network element.

The mobility management device may determine, in one or more of the following three manners, that a same control plane function network element and a same user plane function network element need to be selected for the PDU session corresponding to the first DNN.

In a first manner, the request for establishing the first PDU session includes second indication information, and the second indication information is used to indicate that a same control plane function network element and a same user plane function network element need to be selected for the PDU session corresponding to the first DNN that is established by the terminal. That the mobility management device determines that a same control plane function network element and a same user plane function network element need to be selected for a PDU session corresponding to the first DNN includes determining, by the mobility management device according to the second indication information, that a same control plane function network element and a same user plane function network element need to be selected for the PDU session corresponding to the first DNN that is established by the terminal.

In a possible implementation, the second indication information is SSC mode 1.

In a second manner, that the mobility management device determines that a same control plane function network element and a same user plane function network element need to be selected for a PDU session corresponding to the first DNN includes determining, by the mobility management device according to third indication information, that a same control plane function network element and a same user plane function network element need to be selected for the PDU session corresponding to the first DNN that is established by the terminal. The third indication information is used to indicate that a same control plane function network element and a same user plane function network element need to be selected for the PDU session corresponding to the first DNN that is established by the terminal, and the third indication information is from a user data management network element or from a policy management network element.

In a third manner, that the mobility management device determines that a same control plane function network element and a same user plane function network element need to be selected for a PDU session corresponding to the first DNN includes determining, by the mobility management device according to fourth indication information, that a same control plane function network element and a same user plane function network element need to be selected for the PDU session corresponding to the first DNN. The fourth indication information is used to indicate that a same control plane function network element and a same user plane function network element need to be selected for the PDU session corresponding to the first DNN, and the fourth indication information is from a policy management network element or from the mobility management network element.

In an optional embodiment, S320 may include, when the mobility management device determines, based on a first correspondence set, that a first control plane function network element is a control plane function network element for a second PDU session, determining, by the mobility management device, that a same control plane function network element needs to be selected or a same control plane function network element and a same user plane function network element need to be selected for the PDU session corresponding to the first DNN, where the first correspondence set is used to indicate that a same specific control plane function network element needs to be selected when the mobility management device receives a request for establishing a plurality of PDU sessions that carry a specific DNN, and the first correspondence set includes a correspondence between the first DNN and the first control plane function network element.

In this embodiment of this application, in addition to determining, in one or more of the following three manners, that a same control plane function network element needs to be selected or a same control plane function network element and a same user plane function network element need to be selected for the PDU session corresponding to the first DNN, the mobility management device may further determine, when determining the first control plane function network element as the control plane function network element for the second PDU session based on the first correspondence set in S250, that a same control plane function network element needs to be selected or a same control plane function network element and a same user plane function network element need to be selected for the PDU session corresponding to the first DNN. That is, provided that a specific control plane function network element corresponding to the first DNN is found in the first correspondence set, the mobility management device may determine that the specific control plane function network element needs to be selected or a same control plane function network element and a same user plane function network element need to be selected for the PDU session corresponding to the first DNN.

In an optional embodiment, if the mobility management device determines that a same control plane function network element and a same user plane function network element need to be selected for the PDU session corresponding to the first DNN, the method further includes sending, by the mobility management device, fifth indication information to the first control plane function network element, where the fifth indication information is used to indicate that the PDU session corresponding to the first DNN corresponds to a same user plane function network element. For example, the request for establishing the first PDU session may carry the fifth indication information.

S330. The mobility management device determines that the first control plane function network element is the control plane function network element for the first PDU session.

S340. The mobility management device sends the request for establishing the first PDU session to the first control plane function network element, and the first control plane function network element receives the request for establishing the first PDU session that is sent by the mobility management device, where the request for establishing the first PDU session includes the first DNN.

S350. The control plane function network element determines that a same user plane function network element needs to be selected for the PDU session corresponding to the first DNN.

In S350, that a same user plane function network element needs to be selected for the PDU session corresponding to the first DNN may be determined in the following three manners.

In a first manner, the request for establishing the first PDU session includes second indication information, and the second indication information is used to indicate that a same user plane function network element needs to be selected for the PDU session corresponding to the first DNN that is established by the terminal.

That the control plane function network element determines that a same user plane function network element needs to be selected for the PDU session corresponding to the first DNN includes determining, by the control plane function network element according to the second indication information, that a same user plane function network element needs to be selected for the PDU session corresponding to the first DNN.

Optionally, the second indication information is SSC mode 1.

In a second manner, S350 includes determining, by the control plane function network element according to third indication information, that a same user plane function network element needs to be selected for the PDU session corresponding to the first DNN that is established by the terminal. The third indication information is used to indicate that a same user plane function network element needs to be selected for the PDU session corresponding to the first DNN that is established by the terminal, and the third indication information is from a user data management network element or from a policy management network element.

In a third manner, S350 includes determining, by the control plane function network element according to fourth indication information, that a same user plane function network element needs to be selected for the PDU session corresponding to the first DNN. The fourth indication information is used to indicate that a same user plane function network element needs to be selected for the PDU session corresponding to the first DNN, and the fourth indication information is from a policy management network element or from the control plane function network element.

It should be understood that the three manners in which the control plane function network element determines that a same user plane function network element needs to be selected for the PDU session corresponding to the first DNN are the same as the three manners in which the control plane function network element determines that a same control plane function network element and a same user plane function network element need to be selected for the PDU session corresponding to the first DNN in S220. To avoid repetition, details are not described in this embodiment of this application.

In an optional embodiment, S350 includes determining, by the control plane function network element according to fifth indication information, that a same user plane function network element needs to be selected for the PDU session corresponding to the first DNN. In this case, the control plane function network element may not determine, in the foregoing three manners, that a same user plane function network element needs to be selected for the PDU session corresponding to the first DNN, but directly performs determining according to the fifth indication information sent by the mobility management network element. This helps reduce signaling overheads of the control plane function network element.

S360. The control plane function network element determines that a first user plane function network element is a user plane function network element for the first PDU session.

In an optional embodiment, the control plane function network element determines whether a PDU session with the same first DNN has been established, and when a PDU session with the same first DNN has been established, determines that the first user plane function network element is the same user plane function network element for the established PDU session with the same first DNN. In this embodiment of this application, the first PDU session may be a PDU session that carries the first DNN and that is established by the terminal for the first time, or may be a PDU session that carries the first DNN and that is established by the terminal not for the first time. If the first PDU is the PDU session established for the first time, the control plane function network element may determine the first user plane function network element based on locations of user plane function network elements, load of user plane function network elements, or the like in a current network topology. If the first PDU session is the PDU session that is established not for the first time, the control plane function network element determines that a user plane function network element for an established PDU session with the first DNN is the first user plane function network element.

It should be understood that the three manners in which the mobility management device determines that a same control plane function network element and a same user plane function network element need to be selected for the PDU session corresponding to the first DNN are similar to the three manners in which the control plane function network element determines that a same control plane function network element and a same user plane function network element need to be selected for the PDU session corresponding to the first DNN. The three manners in which the mobility management device determines that a same control plane function network element needs to be selected for the PDU session corresponding to the first DNN are similar to the three manners in which the control plane function network element determines that a same control plane function network element and a same user plane function network element need to be selected for the PDU session corresponding to the first DNN. To avoid repetition, details are not described in this embodiment of this application.

It should be understood that, in this embodiment of this application, for example, the first control plane function network element may be any control plane function network element, and does not indicate a same device. That is, in this embodiment of this application, "first" and "second" each do not indicate a specific one, but generally indicate any one. For another example, in this embodiment of this application, a same noun may indicate different meanings in different method embodiments. In the method 200, the second indication information is used to indicate that a same control plane function network element and a same user plane function network element need to be selected for the PDU session corresponding to the first DNN that is established by the terminal. In the method 300, the second indication information is used to indicate that a same control plane function network element needs to be selected for the PDU session corresponding to the first DNN that is established by the terminal. This is not limited in this embodiment of this application.

Figure 4:
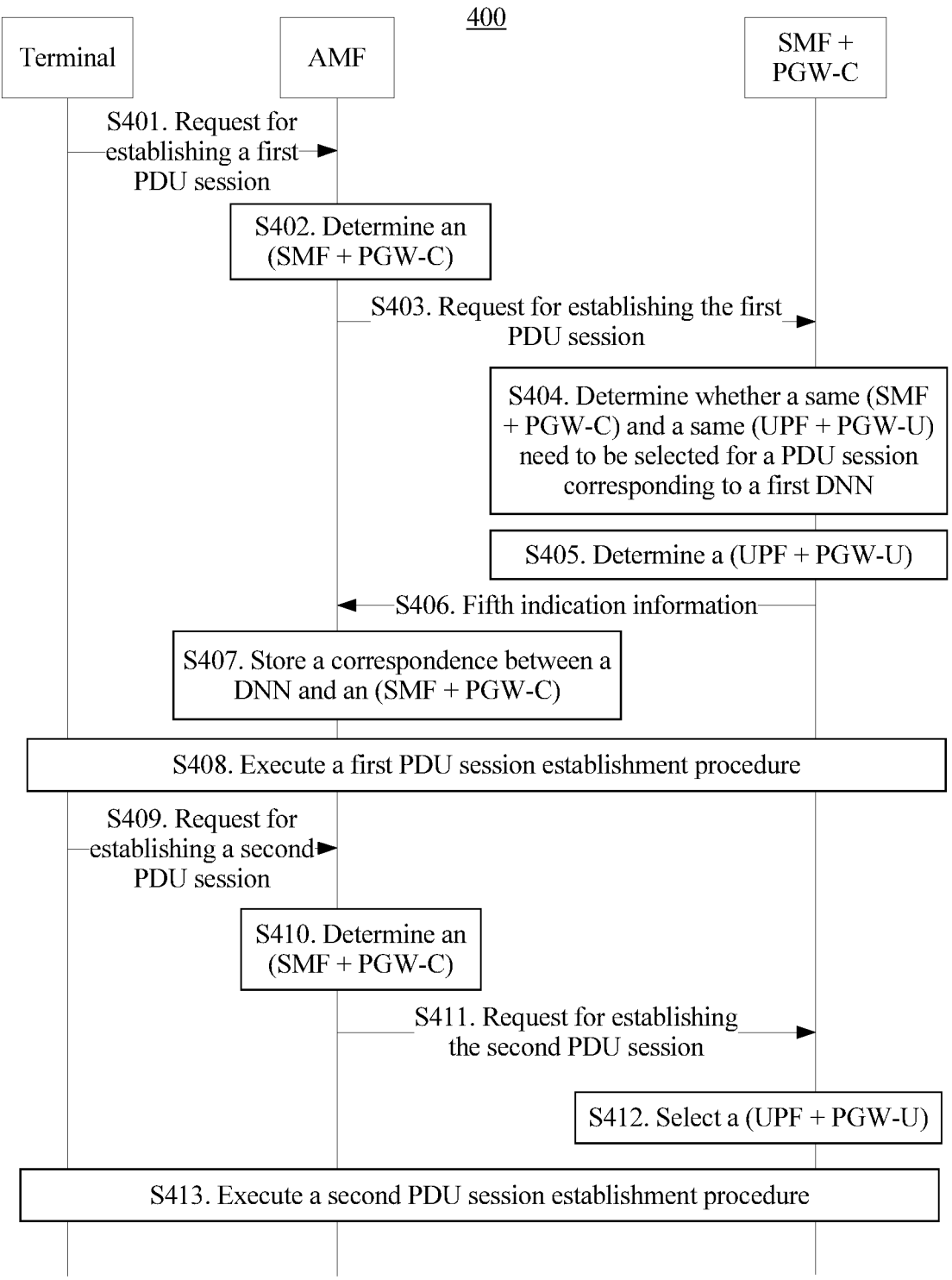
FIG. 4 is a schematic diagram of another method for determining a PDU session service network element according to an embodiment of this application.
Figure 5:
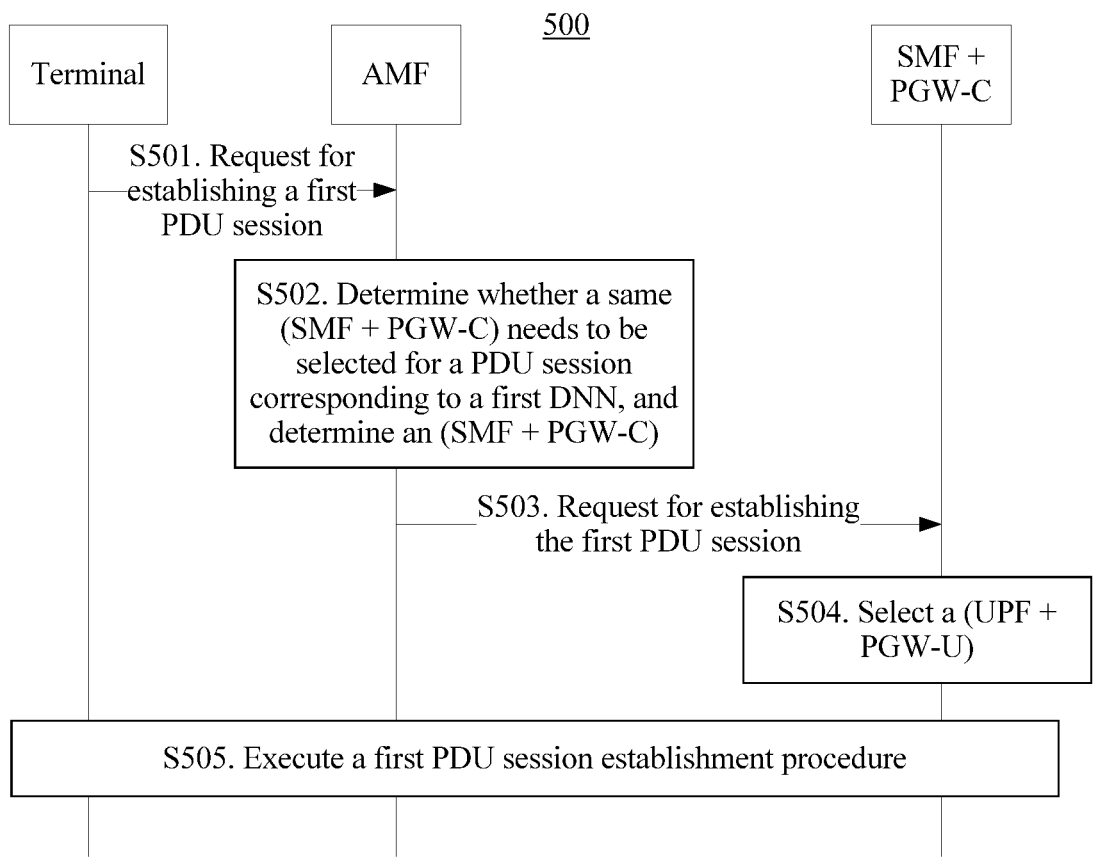
FIG. 5 is a schematic diagram of still another method for determining a PDU session service network element according to an embodiment of this application.
Figure 6:
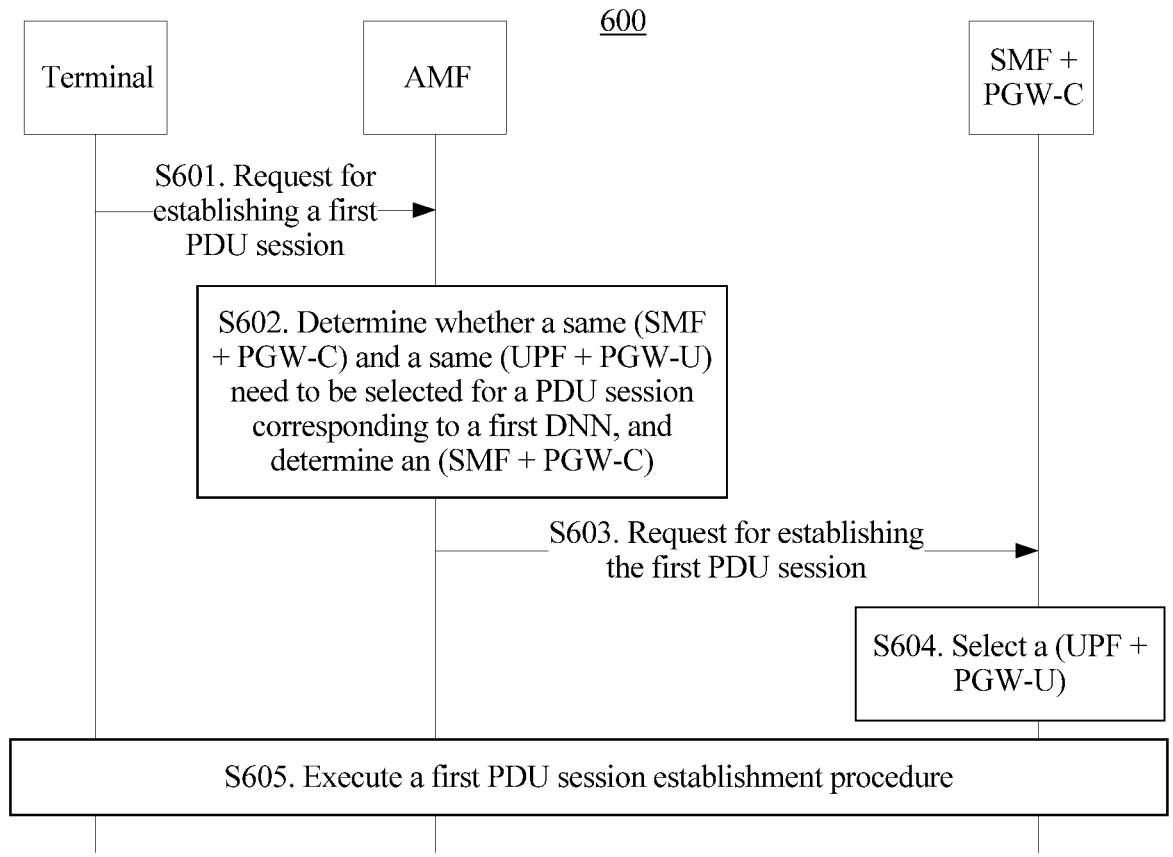
FIG. 6 is a schematic diagram of still another method for determining a PDU session service network element according to an embodiment of this application.

With reference to FIG. 4 to FIG. 6, the following describes in detail methods for determining a PDU session service network element according to the embodiments of this application. Methods 400 to 600 are described using an example in which a mobility management device is an AMF, and a control plane function network element is an (SMF+PGW-C). However, the embodiments of this application are not limited thereto.

Currently, for a plurality of PDU sessions having a same DNN, selecting an (SMF+PGW-C) or a UPF is not limited. For example, different (SMF+PGW-C) may serve a plurality of PDU sessions having a same DNN. In addition, even though an (SMF+PGW-C) for these PDU sessions is the same, (UPF+PGW-C) may be different. In this case, if an APN is equivalent to a DNN, and all PDU sessions having a same DNN need to be switched to a 4G network, a problem occurs. Because it cannot be ensured that a same PGW-C of the 4G network is selected for PDN connections with a same APN, an APN AMBR cannot be implemented.

To resolve the foregoing problem, it is assumed that PDU sessions with a DNN that need to be switched to a 4G network are configured or limited to a same network slice. If a terminal requests PDU sessions having a same DNN, but the PDU sessions have different S-NSSAI, a network device may reject the request of the terminal.

In this embodiment of this application, the following two cases are described. In a first case, an (SMF+PGW-C) determines to select a same (SMF+PGW-C) and a same (UPF+PGW-U). In a second case, an AMF determines to select a same (SMF+PGW-C) or select a same (SMF+PGW-C) and a same (UPF+PGW-U).

In a first case, when the terminal requests a PDU session having a DNN for the first time, the SMF detects that all PDU sessions related to the DNN need to be switched to a 4G network or a same (SMF+PGW-C) and a same (UPF+PGW-U) need to be selected for all PDU sessions related to the DNN (for example, based on a local configuration of the SMF, an indication in subscription data of the DNN, or an indication received by the SMF from a PCF). The (SMF+PGW-C) stores a correspondence between the DNN and the (UPF+PGW-U), and then instructs the AMF to select a same (SMF+PGW-C) next time the AMF receives a request for establishing a PDU session having the same DNN. The AMF stores a correspondence between the DNN and the SMF. Next time the AMF receives a request for establishing a new PDU session having the same DNN, the AMF selects the same (SMF+PGW-C). The (SMF+PGW-C) uses the (UPF+PGW-U) selected for the previously established PDU session corresponding to the DNN as a (UPF+PGW-U) for the new PDU session. In this case, because a same (SMF+PGW-C) and a same (UPF+PGW-U) are selected for all the PDU sessions having the same DNN, all the PDU sessions having the same DNN can be switched to the 4G network without collision.

Optionally, in a first case, when the terminal requests to establish a PDU session carrying a specific DNN and specific S-NSSAI for the first time, the SMF detects that all PDU sessions related to the DNN and the S-NSSAI need to be switched to a 4G network or a same (SMF+PGW-C) and a same (UPF+PGW-U) need to be selected for all PDU sessions related to the DNN and the S-NSSAI (for example, based on a local configuration of the SMF, an indication in subscription data of the DNN, or an indication received by the SMF from a PCF). The (SMF+PGW-C) stores a correspondence between the DNN and the (UPF+PGW-U), and then instructs the AMF to select a same (SMF+PGW-C) next time the AMF receives a request for establishing a PDU session having the same DNN and the same S-NSSAI. The AMF stores a correspondence between the DNN, the S-NSSAI, and the SMF. Next time the AMF receives a request for establishing a new PDU session carrying the same DNN and the same S-NSSAI, the AMF selects the same (SMF+PGW-C). The (SMF+PGW-C) uses the (UPF+PGW-U) selected for the previously established PDU session corresponding to the DNN and the S-NSSAI as a (UPF+PGW-U) for the new PDU session. In this case, because a same (SMF+PGW-C) and a same (UPF+PGW-U) are selected for all the PDU sessions having the same DNN and the same S-NSSAI, all the PDU sessions having the same DNN and the same S-NSSAI can be switched to the 4G network without collision.

In a second case, when the terminal requests a PDU session having a DNN for the first time, the AMF detects that all PDU sessions having the DNN need to be switched to a 4G network, and the AMF determines to select a same (SMF+PGW-C) for all PDU sessions having the DNN (for example, based on a local configuration of the AMF, an indication in subscription data of the DNN, or an indication received by the AMF from a PCF). The AMF stores a correspondence between the DNN and the (SMF+PGW-C). Optionally, the AMF determines to select a same (SMF+PGW-C) and a same (UPF+PGW-U) for all PDU sessions having the DNN, and the AMF indicates, to the (SMF+PGW-C), that a same (UPF+PGW-U) is selected for PDU sessions having the DNN. Optionally, the (SMF+PGW-C) determines to select a same (UPF+PGW-U) for PDU sessions having the DNN. When the AMF receives a request for establishing a new PDU session having the DNN (for a same terminal), the AMF selects the (SMF+PGW-C) based on the correspondence. The (SMF+PGW-C) uses the (UPF+PGW-U) selected for the previously established PDU session corresponding to the DNN as a (UPF+PGW-U) for the new PDU session. In this case, because a same (SMF+PGW-C) and a same (UPF+PGW-U) are selected for all the PDU sessions having the same DNN, all the PDU sessions having the same DNN can be switched to the 4G network without collision.

Optionally, in a second case, when the terminal requests to establish a PDU session carrying a specific DNN and specific S-NSSAI for the first time, the AMF detects that all PDU sessions having the DNN need to be switched to a 4G network, and the AMF determines to select a same (SMF+PGW-C) for all PDU sessions having the DNN and the S-NSSAI (for example, based on a local configuration of the AMF, an indication in subscription data of the DNN, or an indication received by the AMF from a PCF). The AMF stores a correspondence between the DNN, the S-NSSAI, and the (SMF+PGW-C). Optionally, the AMF determines to select a same (SMF+PGW-C) and a same (UPF+PGW-U) for all PDU sessions having the DNN and the S-NSSAI, and the AMF indicates, to the (SMF+PGW-C), that a same (UPF+PGW-U) is selected for PDU sessions having the DNN and the S-NSSAI. Optionally, the (SMF+PGW-C) determines to select a same (UPF+PGW-U) for PDU sessions having the DNN and the S-NSSAI. When the AMF receives a request for establishing a new PDU session having the DNN and the S-NSSAI (for a same terminal), the AMF selects the (SMF+PGW-C) based on the correspondence. The (SMF+PGW-C) uses the (UPF+PGW-U) selected for the previously established PDU session corresponding to the DNN and the S-NSSAI as a (UPF+PGW-U) for the new PDU session. In this case, because a same (SMF+PGW-C) and a same (UPF+PGW-U) are selected for all the PDU sessions having the same DNN and the same S-NSSAI, all the PDU sessions having the same DNN and the same S-NSSAI can be switched to the 4G network without collision.

The following describes a method 400 for determining a PDU session service network element in a first case. As shown in FIG. 4, the method 400 includes the following steps.

S401. A terminal sends a request for establishing a first PDU session to an AMF, where the request for establishing the first PDU session carries an identifier of the first PDU session and a first DNN.

Optionally, the request for establishing the first PDU session may further carry at least one of an identifier of the terminal, first S-NSSAI, an SSC mode, and the like.

S402. The AMF receives the request for establishing the first PDU session that is sent by the terminal, and determines that the terminal establishes, for the first time, a PDU session that accesses a data network indicated by the first DNN, and the AMF determines an (SMF+PGW-C) for the first PDU session.

Further, after receiving a request for establishing a PDU session that is sent by the terminal and that carries the first DNN, the AMF searches related information of the terminal that is stored by the AMF to determine whether the terminal establishes a PDU session carrying the first DNN. If the terminal establishes no PDU session carrying the first DNN, the first PDU session is a PDU session carrying the first DNN that is established by the terminal for the first time, and the AMF records information about the first DNN in the related information of the terminal such that next time the AMF receives a PDU session carrying the first DNN, the AMF determines that the PDU session carrying the first DNN that is received next time is not a session established for the first time.

When determining that the terminal establishes, for the first time, a PDU session that accesses the data network indicated by the first DNN, the AMF may determine an anchoring (SMF+PGW-C) for the first PDU session according to the other approaches. For example, the AMF determines the (SMF+PGW-C) according to the first S-NSSAI and the DNN in the request for establishing the first PDU session, subscription information of the terminal, and a local operator policy.

S403. The AMF sends the request for establishing the first PDU session to the (SMF+PGW-C) determined in S402, where the request for establishing the first PDU session carries the identifier of the first PDU session and the first DNN.

S404. The (SMF+PGW-C) receives the request for establishing the first PDU session that is sent by the AMF, and determines whether a same (SMF+PGW-C) and a same (UPF+PGW-U) need to be selected for a PDU session corresponding to the first DNN in the request for establishing the first PDU session.

Further, in S404, one or more of the following five manners are used to determine whether a same (SMF+PGW-C) and a same (UPF+PGW-U) need to be selected for the PDU session corresponding to the first DNN in the request for establishing the first PDU session.

In a first manner, the (SMF+PGW-C) obtains subscription data of the first DNN, where the subscription data of the first DNN includes second indication information, and the second indication information is used to indicate whether a same (SMF+PGW-C) and a same (UPF+PGW-U) need to be selected for all PDU sessions corresponding to the first DNN. Alternatively, the second indication information is used to indicate whether a same (SMF+PGW-C) and a same (UPF+PGW-U) need to be selected for all PDU sessions corresponding to the first DNN and the S-NSSAI.

Further, subscription data of the first DNN established by the terminal may be stored in UDM, and the (SMF+PGW-C) may obtain, from the UDM, the subscription data of the first DNN established by the terminal. Subscription data of the first DNN established by a plurality of terminals may be stored in UDM, the (SMF+PGW-C), or the AMF. The (SMF+PGW-C) may obtain, from the UDM, the AMF, or the (SMF+PGW-C) itself, the subscription data of the first DNN established by the plurality of terminals.

In a possible implementation, when the (SMF+PGW-C) receives the request for establishing the first PDU session that is sent by the AMF, the (SMF+PGW-C) requests subscription data of the terminal from the UDM, where the subscription data of the terminal includes the subscription data of the first DNN. The (SMF+PGW-C) determines, based on the subscription data of the first DNN, whether a same (SMF+PGW-C) and a same (UPF+PGW-U) need to be selected for the currently received first PDU session that carries the first DNN and another PDU session that carries the same first DNN and that is initiated by the terminal. The other PDU session that carries the same first DNN and that is initiated by the terminal may be a PDU session initiated by the terminal before the current PDU session, or may be a PDU session that may be subsequently initiated.

In a second manner, the (SMF+PGW-C) determines, according to a preset rule, whether a same (SMF+PGW-C) and a same (UPF+PGW-U) need to be selected for all PDU sessions corresponding to the first DNN. For example, the preset rule may be that a same (SMF+PGW-C) and a same (UPF+PGW-U) need to be selected for one or more PDU sessions corresponding to some specific DNNs, and there is no need to select a same (SMF+PGW-C) and a same (UPF+PGW-U) for one or more PDU sessions corresponding to some specific DNNs. Alternatively, the preset rule may be that a same (SMF+PGW-C) and a same (UPF+PGW-U) need to be selected for one or more PDU sessions corresponding to some specific DNNs and specific S-NSSAI, and there is no need to select a same (SMF+PGW-C) and a same (UPF+PGW-U) for one or more PDU sessions corresponding to some specific DNNs and specific S-NSSAI.

Further, when the (SMF+PGW-C) receives the request for establishing the first PDU session that is sent by the AMF, the (SMF+PGW-C) finds a preset rule corresponding to the first DNN, and determines whether a same (SMF+PGW-C) and a same (UPF+PGW-U) need to be selected for the currently received first PDU session that carries the first DNN and another PDU session that carries the same first DNN. Alternatively, the (SMF+PGW-C) finds a preset rule corresponding to the first DNN and the first S-NSSAI (carried in the request for establishing the first PDU session), and determines whether a same (SMF+PGW-C) and a same (UPF+PGW-U) need to be selected for the currently received first PDU session that carries the same first DNN and the same first S-NSSAI and another PDU session that carries the same first DNN and the same first S-NSSAI. The other PDU session that carries the same first DNN or carries the same first DNN and the same first S-NSSAI may be PDU sessions initiated by different terminals before the current PDU session, or may be PDU sessions that may be subsequently initiated by different terminals. The PDU session corresponding to the first DNN may be PDU sessions that carry the first DNN and that are established by any different terminals, or the PDU session corresponding to the first DNN may be a PDU session that carries the first DNN and that is established by one terminal. This is not limited in this embodiment of this application. The PDU session that carries the first DNN and the first S-NSSAI may be PDU sessions established by any different terminals, or the PDU session that carries the first DNN and the first S-NSSAI may be a PDU session established by one terminal. This is not limited in this embodiment of this application.

In a third manner, the (SMF+PGW-C) determines, based on the SSC mode of the first PDU session, whether a same (SMF+PGW-C) and a same (UPF+PGW-U) need to be selected for the PDU session that carries the first DNN and that is established by the terminal. For example, if the SSC mode of the first PDU session is SSC mode 1, the (SMF+PGW-C) determines that a same (SMF+PGW-C) and a same (UPF+PGW-U) need to be selected for the PDU session that carries the first DNN and that is established by the terminal (it may be assumed that SSC modes of all PDU sessions that carry the first DNN and that are established by the terminal are the same). If the SSC mode of the first PDU session is SSC mode 2 or SSC mode 3, the (SMF+PGW-C) determines that there is no need to select a same (SMF+PGW-C) and a same (UPF+PGW-U) for the PDU session.

In a fourth manner, the (SMF+PGW-C) obtains third indication information from a PCF, where the third indication information is used to indicate whether a same (SMF+PGW-C) and a same (UPF+PGW-U) need to be selected for all PDU sessions corresponding to the first DNN. In this manner, all the PDU sessions corresponding to the first DNN may be all PDU sessions that carry the first DNN and that are established by one terminal, or may be all PDU sessions that carry the first DNN and that are established by different terminals. Alternatively, the (SMF+PGW-C) obtains third indication information from a PCF, where the third indication information is used to indicate whether a same (SMF+PGW-C) and a same (UPF+PGW-U) need to be selected for PDU sessions that carry the first DNN and the first S-NSSAI. In this manner, the PDU sessions that carry the first DNN and the first S-NSSAI may be PDU sessions established by one terminal, or may be PDU sessions established by different terminals.

When the (SMF+PGW-C) receives the request for establishing the first PDU session that is sent by the AMF, the (SMF+PGW-C) sends a request message to the PCF to request the third indication information. The (SMF+PGW-C) determines, according to the third indication information, whether a same (SMF+PGW-C) and a same (UPF+PGW-U) need to be selected for the currently received first PDU session that carries the first DNN and other PDU sessions that carry the same first DNN. Alternatively, the (SMF+PGW-C) determines, according to the third indication information, whether a same (SMF+PGW-C) and a same (UPF+PGW-U) need to be selected for the currently received first PDU session that carries the first DNN and the first S-NSSAI and other PDU sessions that carry the same first DNN and the same first S-NSSAI. The other PDU sessions that carry the same first DNN may be PDU sessions initiated by different terminals before the current PDU session, or may be PDU sessions that may be subsequently initiated by different terminals.

In a fifth manner, the terminal adds fourth indication information to the request for establishing the first PDU session in S401, where the fourth indication information is used to indicate that a same (SMF+PGW-C) and a same (UPF+PGW-U) need to be selected for all PDU sessions that carry the first DNN and that are established by the terminal. Alternatively, the fourth indication information is used to indicate that a same (SMF+PGW-C) and a same (UPF+PGW-U) need to be selected for all PDU sessions that carry the first DNN and the first S-NSSAI and that are established by the terminal. In S403, the fourth indication information is sent to the (SMF+PGW-C) using the request for establishing the first PDU session. The (SMF+PGW-C) determines, according to the fourth indication information in the request for establishing the first PDU session, that a same (SMF+PGW-C) and a same (UPF+PGW-U) need to be selected for PDU sessions that carry the first DNN (or PDU sessions that carry the first DNN and the first S-NSSAI) and that are established by the terminal. For example, the fourth indication information may be SSC mode 1.

S405. If it is determined in S404 that a same (SMF+PGW-C) and a same (UPF+PGW-U) need to be selected for the PDU session that carries the first DNN, the (SMF+PGW-C) is the same (SMF+PGW-C), and the (SMF+PGW-C) selects a same (UPF+PGW-U) for the PDU session that carries the first DNN, alternatively, if it is determined in S404 that a same (SMF+PGW-C) and a same (UPF+PGW-U) need to be selected for the PDU session that carries the first DNN and the first S-NSSAI, the (SMF+PGW-C) is the same (SMF+PGW-C), and the (SMF+PGW-C) selects a same (UPF+PGW-U) for the PDU session that carries the first DNN and the first S-NSSAI.

Further, after receiving a request, sent by the AMF, for establishing the first PDU session that carries the first DNN, the (SMF+PGW-C) searches related information stored by the (SMF+PGW-C) to determine whether a PDU session carrying the first DNN is established. If no PDU session carrying the first DNN is established, the first PDU session is a PDU session carrying the first DNN that is established for the first time, and the (SMF+PGW-C) records information about the first DNN in the related information such that next time the (SMF+PGW-C) receives a PDU session carrying the first DNN, the (SMF+PGW-C) determines that the PDU session carrying the first DNN that is received next time is not a session established for the first time.

When the first PDU session is a PDU session carrying the first DNN that is established for the first time, the (SMF+PGW-C) may determine an anchoring (UPF+PGW-U) for the first PDU session according to the other approaches. For example, the (SMF+PGW-C) may select a (UPF+PGW-U) for the first PDU session based on (UPF+PGW-U) location information, load information, and the like.

Optionally, the (SMF+PGW-C) stores a correspondence between the first DNN and the selected (UPF+PGW-U). For example, as shown in Table 1, the first column represents DNNs, and the second column represents (UPF+PGW-U)

identifiers. To be specific, the (SMF+PGW-C) and (UPF+PGW-U) 1 need to be selected for a PDU session corresponding to DNN 1, and the (SMF+PGW-C) and (UPF+PGW-U) 2 need to be selected for a PDU session corresponding to DNN 2.

TABLE 1

| DNN | (UPF + PGW-U) identifier |
|---|---|
| DNN 1 | (UPF + PGW-U) 1 |
| DNN 2 | (UPF + PGW-U) 2 |

Optionally, the (SMF+PGW-C) stores a correspondence between the DNN, the S-NSSAI, and the selected (UPF+PGW-U). For example, as shown in Table 2, the first column represents DNNs, the second column represents S-NSSAI, and the third column represents (UPF+PGW-U) identifiers. To be specific, the (SMF+PGW-C) and (UPF+PGW-U) 1 need to be selected for a PDU session corresponding to DNN 1 and S-NSSAI 1, and the (SMF+PGW-C) and (UPF+PGW-U) 2 need to be selected for a PDU session corresponding to DNN 2 and S-NSSAI 2.

TABLE 2

| DNN | S-NSSAI | (UPF + PGW-U) identifier |
|---|---|---|
| DNN 1 | S-NSSAI 1 | (UPF + PGW-U) 1 |
| DNN 2 | S-NSSAI 2 | (UPF + PGW-U) 2 |

S406. The (SMF+PGW-C) sends fifth indication information to the AMF, where the fifth indication information is used to instruct to select a same (SMF+PGW-C) when the AMF receives a PDU session corresponding to the first DNN again, or the fifth indication information is used to instruct to select a same (SMF+PGW-C) when the AMF receives a PDU session corresponding to the first DNN and the first S-NSSAI again.

Optionally, the (SMF+PGW-C) may send the fifth indication information to the AMF using a response message for the request for establishing the first PDU session, or the (SMF+PGW-C) may separately send the fifth indication information to the AMF.

S407. The AMF receives the fifth indication information sent by the (SMF+PGW-C). The AMF may receive fifth indication information sent by a plurality of (SMF+PGW-C), and store correspondences between a plurality of DNNs and the plurality of (SMF+PGW-C), or store correspondences between a plurality of DNNs, a plurality of pieces of S-NSSAI, and the plurality of (SMF+PGW-C).

For example, as shown in Table 3, the first column represents DNNs, and the second column represents (SMF+PGW-C) identifiers. The AMF receives fifth indication information sent by (SMF+PGW-C) 1 and (SMF+PGW-C) 2. The fifth indication information sent by (SMF+PGW-C) 1 is used to instruct to select (SMF+PGW-C) 1 when the AMF receives a PDU session corresponding to DNN 1 again, and the fifth indication information sent by (SMF+PGW-C) 2 is used to instruct to select (SMF+PGW-C) 2 when the AMF receives a PDU session corresponding to DNN 2 again. That is, (SMF+PGW-C) 1 needs to be selected for a PDU session corresponding to DNN 1, and (SMF+PGW-C) 2 needs to be selected for a PDU session corresponding to DNN 2.

TABLE 3

| DNN | (SMF + PGW-C) identifier |
|---|---|
| DNN 1 | (SMF + PGW-C) 1 |
| DNN 2 | (SMF + PGW-C) 2 |

Alternatively, as shown in Table 4, the first column represents DNNs, the second column represents S-NSSAI, and the third column represents (SMF+PGW-C) identifiers. The AMF receives fifth indication information sent by (SMF+PGW-C) 1 and (SMF+PGW-C) 2. The fifth indication information sent by (SMF+PGW-C) 1 is used to instruct to select (SMF+PGW-C) 1 when the AMF receives a PDU session corresponding to DNN 1 and S-NSSAI 1 again, and the fifth indication information sent by (SMF+PGW-C) 2 is used to instruct to select (SMF+PGW-C) 2 when the AMF receives a PDU session corresponding to DNN 2 and S-NSSAI 2 again. That is, (SMF+PGW-C) 1 needs to be selected for a PDU session corresponding to DNN 1 and S-NSSAI 1, and (SMF+PGW-C) 2 needs to be selected for a PDU session corresponding to DNN 2 and S-NSSAI 2.

TABLE 4

| DNN | S-NSSAI | (SMF + PGW-C) identifier |
|---|---|---|
| DNN 1 | S-NSSAI 1 | (SMF + PGW-C) 1 |
| DNN 2 | S-NSSAI 2 | (SMF + PGW-C) 2 |

It should be understood that one (SMF+PGW-C) may be corresponding to one or more DNNs, but one DNN corresponds to one (SMF+PGW-C). If S-NSSAI is considered, one DNN and one piece of S-NSSAI correspond to one (SMF+PGW-C).

Optionally, the AMF may store a correspondence between a DNN and an (SMF+PGW-C), and may store the correspondence in a context of the terminal or separately store the correspondence. Optionally, the AMF may separately store or store, in a context of the terminal, a correspondence between a DNN and an (SMF+PGW-C) and information indicating whether a same (SMF+PGW-C) needs to be selected for a PDU session corresponding to the DNN. For example, as shown in Table 5, (SMF+PGW-C) 1 may be selected for a PDU session corresponding to DNN 1, (SMF+PGW-C) 2 may be selected for a PDU session corresponding to DNN 2, and there is no need to select (SMF+PGW-C) 3 for all PDU sessions corresponding to DNN 3. Certainly, during storing, only the first three columns of Table 5 may be stored, and the fourth column is not stored. In this case, a same (SMF+PGW-C) needs to be selected for PDU sessions corresponding to a stored DNN.

TABLE 5

| PDU session identifier | DNN | (SMF + PGW-C) identifier | Whether to select a same (SMF + PGW-C) |
|---|---|---|---|
| 1 | DNN 1 | (SMF + PGW-C) 1 | Yes |
| 2 | DNN 2 | (SMF + PGW-C) 2 | Yes |
| 3 | DNN 3 | (SMF + PGW-C) 3 | No |

Optionally, the AMF may store a correspondence between a DNN, S-NSSAI, and an (SMF+PGW-C), and may store the correspondence in a context of the terminal or separately store the correspondence. Optionally, the AMF may separately store or store, in a context of the terminal, a correspondence between a DNN, S-NSSAI, and an (SMF+PGW-C), and information indicating whether a same (SMF+PGW- C) needs to be selected for a PDU session corresponding to the DNN. For example, as shown in Table 6, (SMF+PGW-C) 1 may be selected for a PDU session corresponding to DNN 1 and S-NSSAI 1, (SMF+PGW-C) 2 may be selected for a PDU session corresponding to DNN 2 and S-NSSA 2, and there is no need to select (SMF+PGW-C) 3 for all PDU sessions corresponding to DNN 3 and S-NSSAI 3. Certainly, during storing, only the first four columns of Table 6 may be stored, and the fifth column is not stored. In this case, a same (SMF+PGW-C) needs to be selected for PDU sessions corresponding to a stored DNN.

TABLE 6

| PDU session identifier | DNN | S-NSSAI | (SMF + PGW-C) identifier | Whether to select a same (SMF + PGW-C) |
|---|---|---|---|---|
| 1 | DNN 1 | S-NSSAI 1 | (SMF + PGW-C) 1 | Yes |
| 2 | DNN 2 | S-NSSAI 2 | (SMF + PGW-C) 2 | Yes |
| 3 | DNN 3 | S-NSSAI 3 | (SMF + PGW-C) 3 | No |

S408. For a process of establishing the first PDU session by a terminal, a RAN, an AMF, an (SMF+PGW-C), a (UDM+HSS), a PCF, and a (UPF+PGW-U), refer to the other approaches. To avoid repetition, details are not described in this embodiment of this application.

S409. The terminal initiates a request for establishing a second PDU session to the AMF, where the request for establishing the second PDU session includes an identifier of the second PDU session and the first DNN. It is assumed herein that the second PDU session and the first PDU session have the same first DNN, and it is assumed that the first DNN is DNN 1.

Optionally, the request for establishing the second PDU session may further carry at least one of an identifier of the terminal, S-NSSAI, an SSC mode, and the like.

S410. The AMF may determine, according to Table 3, that an (SMF+PGW-C) corresponding to DNN 1 is (SMF+PGW-C) 1 (the (SMF+PGW-C) 1 is the foregoing (SMF+PGW-C)). Alternatively, the AMF may determine, according to Table 5, that an (SMF+PGW-C) corresponding to DNN 1 is (SMF+PGW-C) 1, and (SMF+PGW-C) 1 may be selected for all PDU sessions corresponding to DNN 1. Alternatively, the AMF may determine, according to Table 4, that an (SMF+PGW-C) corresponding to DNN 1 and S-NSSAI 1 is (SMF+PGW-C) 1 (the (SMF+PGW-C) 1 is the foregoing (SMF+PGW-C)). Alternatively, the AMF may determine, according to Table 5, that an (SMF+PGW-C) corresponding to DNN 1 and S-NSSAI 1 is (SMF+PGW-C) 1, and (SMF+PGW-C) 1 may be selected for all PDU sessions corresponding to DNN 1 and S-NSSAI 1.

It should be understood that if the AMF does not determine, in S410, the (SMF+PGW-C) corresponding to the second PDU session, the AMF determines the (SMF+PGW-C) based on the S-NSSAI and the DNN of the second PDU session, subscription information of the terminal, and a local operator policy according to the other approaches.

S411. The AMF sends the request for establishing the second PDU session to (SMF+PGW-C) 1, where the request for establishing the second PDU session carries the identifier of the second PDU session and the DNN.

Optionally, the request for establishing the second PDU session may carry at least one of an identifier of the terminal, S-NSSAI, and an SSC mode.

S412. (SMF+PGW-C) 1 may select a (UPF+PGW-U) for the second PDU session based on a stored correspondence between the DNN and the selected (UPF+PGW-U) in Table 1, where the DNN of the second PDU session is DNN 1, and therefore the (UPF+PGW-U) determined by the (SMF+PGW-C) for the second PDU session is (UPF+PGW-U) 1. Alternatively, (SMF+PGW-C) 1 may select a (UPF+PGW-U) for the second PDU session based on a stored correspondence between the DNN, the S-NSSAI, and the selected (UPF+PGW-U) in Table 2, where the DNN of the second PDU session is DNN 1, the S-NSSAI of the second PDU session is S-NSSAI 1, and therefore the (UPF+PGW-U) determined by the (SMF+PGW-C) for the second PDU session is (UPF+PGW-U) 1.

S413. For a process of establishing the second PDU session by a terminal, a RAN, an AMF, an (SMF+PGW-C), a (UDM+HSS), a PCF, and a (UPF+PGW-U), refer to the other approaches. To avoid repetition, details are not described in this embodiment of this application.

In a possible implementation, the AMF may add sixth indication information to the request for establishing the second PDU session that is sent to (SMF+PGW-C) 1 in S411 in order to indicate that a same (UPF+PGW-U) needs to be selected for the currently received second PDU session that carries DNN 1 and another PDU session that carries the same DNN 1. Optionally, (SMF+PGW-C) 1 queries a PDU session context of the terminal based on DNN 1, and finds that the DNN of the established first PDU session is the same as the DNN of the current second PDU session, and (SMF+PGW-C) 1 obtains, in a context of the first PDU session, (UPF+PGW-U) 1 selected for the first PDU session, and determines (UPF+PGW-U) 1 selected for the first PDU session as (UPF+PGW-U) 1 for the second PDU session. Optionally, (SMF+PGW-C) 1 determines, based on the separately stored DNN 1 and (UPF+PGW-U) 1 corresponding to DNN 1, that the (UPF+PGW-U) for the second PDU session is (UPF+PGW-U) 1.

The following describes a method 500 for determining a PDU session service network element in a second case. As shown in FIG. 5, the method 500 includes the following steps.

S501 is the same as S401. The request for establishing the first PDU session may further carry first S-NSSAI.

S502. The AMF determines whether a same (SMF+PGW-C) needs to be selected for a PDU session corresponding to the first DNN, and determines an (SMF+PGW-C) for the first PDU session, or the AMF determines whether a same (SMF+PGW-C) needs to be selected for a PDU session that carries the first DNN and the first S-NSSAI, and determines an (SMF+PGW-C) for the PDU session that carries the first DNN and the first S-NSSAI.

For a specific determining manner in which the AMF determines whether a same (SMF+PGW-C) needs to be selected for the PDU session corresponding to the first DNN or determines whether a same (SMF+PGW-C) needs to be selected for the PDU session that carries the first DNN and the first S-NSSAI, refer to the five manners in S404 in the method 400.

When determining that a same (SMF+PGW-C) needs to be selected for the PDU session corresponding to the first DNN, the AMF determines the same (SMF+PGW-C), where the same (SMF+PGW-C) is also an (SMF+PGW-C) corresponding to the first PDU session. The AMF determines the same (SMF+PGW-C) depending on whether the first PDU session is a PDU session corresponding to the first DNN that is established for the first time. There may be two cases.

In a first case, if the first PDU session is the PDU session corresponding to the first DNN that is established for the first time, the AMF determines the (SMF+PGW-C) based on the S-NSSAI and the DNN of the first PDU session, subscription information of the terminal, and a local operator policy, and stores a correspondence between the DNN and the (SMF+PGW-C).

Optionally, in a first case, if the first PDU session is a PDU session corresponding to the first DNN and the first S-NSSAI that is established for the first time, the AMF determines the (SMF+PGW-C) based on the S-NSSAI and the DNN of the first PDU session, subscription information of the terminal, and a local operator policy, and stores a correspondence between the DNN, the S-NSSAI, and the (SMF+PGW-C).

In a second case, if the first PDU session is not a PDU session corresponding to the first DNN that is established for the first time, the AMF determines that the (SMF+PGW-C) corresponding to the first DNN that is stored in the first case is the (SMF+PGW-C) for the first PDU session.

Optionally, in a second case, if the first PDU session is not a PDU session corresponding to the first DNN and the first S-NSSAI that is established for the first time, the AMF determines that the (SMF+PGW-C) corresponding to the first DNN and the first S-NSSAI that is stored in the first case is the (SMF+PGW-C) for the first PDU session.

S503. The AMF sends the request for establishing the first PDU session to the (SMF+PGW-C) for the first PDU session, where the request for establishing the first PDU session carries the identifier of the first PDU session and the first DNN.

Optionally, the request for establishing the first PDU session may carry at least one of an identifier of the terminal, S-NSSAI, an SSC mode, and the like.

S504. The (SMF+PGW-C) selects a (UPF+PGW-U) for the PDU session corresponding to the first DNN. The following two cases are described.

In a first case, if the first case in S502 exists, the (SMF+PGW-C) determines, in at least one of the five manners in S404, whether a same (UPF+PGW-U) needs to be selected for the PDU session corresponding to the first DNN. If a same (UPF+PGW-U) needs to be selected for the PDU session corresponding to the first DNN, the (SMF+PGW-C) may select a (UPF+PGW-U) for the PDU session corresponding to the first DNN based on (UPF+PGW-U) location information, load information, and the like. For example, in S405, the (SMF+PGW-C) stores a correspondence between the DNN and the selected (UPF+PGW-U).

Optionally, if the first case in S502 exists, the (SMF+PGW-C) determines, in at least one of the five manners in S404, whether a same (UPF+PGW-U) needs to be selected for the PDU session corresponding to the first DNN and the first S-NSSAI. If a same (UPF+PGW-U) needs to be selected for the PDU session corresponding to the first DNN and the first S-NSSAI, the (SMF+PGW-C) may select a (UPF+PGW-U) for the PDU session that carries the first DNN and the first S-NSSAI based on (UPF+PGW-U) location information, load information, and the like. For example, in S405, the (SMF+PGW-C) stores a correspondence between the first DNN, the first S-NSSAI, and the selected (UPF+PGW-U).

In a second case, if the second case in S502 exists, the (UPF+PGW-U) is selected for the first PDU session in the correspondence between the DNN and the selected (UPF+PGW-U) that is stored in the first case in S504.

Optionally, if the second case in S502 exists, the (UPF+PGW-U) is selected for the first PDU session in the correspondence between the first DNN, the first S-NSSAI, and the selected (UPF+PGW-U) that is stored in the first case in S504.

S505. For a process of establishing the first PDU session by a terminal, a RAN, an AMF, an (SMF+PGW-C), a (UDM+HSS), a PCF, and a (UPF+PGW-U), refer to the other approaches. To avoid repetition, details are not described in this embodiment of this application.

The following describes a method 600 for determining a PDU session service network element in a second case. In the method 500, the AMF determines whether a same (SMF+PGW-C) needs to be selected for the PDU session corresponding to the first DNN. Unlike the method 500, in the method 600, the AMF determines whether a same (SMF+PGW-C) and a same (UPF+PGW-U) need to be selected for the PDU session corresponding to the first DNN. Alternatively, in the method 500, the AMF determines whether a same (SMF+PGW-C) needs to be selected for the PDU session that carries the first DNN and the first S-NSSAI, and in the method 600, the AMF determines whether a same (SMF+PGW-C) and a same (UPF+PGW-U) need to be selected for the PDU session that carries the first DNN and the first S-NSSAI. As shown in FIG. 6, the method 600 includes the following steps.

S601 is the same as S401.

S602. The AMF determines whether a same (SMF+PGW-C) and a same (UPF+PGW-U) need to be selected for a PDU session corresponding to the first DNN, and determines an (SMF+PGW-C) for the first PDU session.

For a manner in which the AMF determines whether a same (SMF+PGW-C) and a same (UPF+PGW-U) need to be selected for the PDU session corresponding to the first DNN, refer to the five manners in S404 for determining whether a same (SMF+PGW-C) and a same (UPF+PGW-U) need to be selected for the PDU session corresponding to the first DNN.

When a same (SMF+PGW-C) and a same (UPF+PGW-U) need to be selected for the PDU session corresponding to the first DNN, the AMF first determines the same (SMF+PGW-C), and a determining manner is the same as S502 in the method 500.

Optionally, S602 may be that the AMF determines whether a same (SMF+PGW-C) and a same (UPF+PGW-U) need to be selected for a PDU session that carries the first DNN and the first S-NSSAI, and determines an (SMF+PGW-C) for the first PDU session.

For a manner in which the AMF determines whether a same (SMF+PGW-C) and a same (UPF+PGW-U) need to be selected for the PDU session that carries the first DNN and the first S-NSSAI, refer to the five manners in S404 for determining whether a same (SMF+PGW-C) and a same (UPF+PGW-U) need to be selected for the PDU session that carries the first DNN and the first S-NSSAI.

When determining that a same (SMF+PGW-C) and a same (UPF+PGW-U) need to be selected for the PDU session that carries the first DNN and the first S-NSSAI, the AMF first determines the same (SMF+PGW-C), and a determining manner is the same as S502 in the method 500.

S603. The AMF sends the request for establishing the first PDU session to the (SMF+PGW-C) determined in S602, where the request for establishing the first PDU session carries the identifier of the first PDU session and the first DNN.

Optionally, the request for establishing the first PDU session may carry at least one of an identifier of the terminal, S-NSSAI, an SSC mode, and the like.

Optionally, the request for establishing the first PDU session includes sixth indication information, and the sixth indication information is used to instruct to select a same (UFP+PGW-U) for the PDU session corresponding to the first DNN. Alternatively, the sixth indication information is used to instruct to select a same (UFP+PGW-U) for the PDU session that carries the first DNN and the first S-NSSAI.

S604. The (SMF+PGW-C) selects a (UPF+PGW-U) for the PDU session corresponding to the first DNN. For a specific manner of selecting the (UPF+PGW-U), refer to S504 in the method 500.

Optionally, in a possible implementation of S603, if the first PDU session is a PDU session corresponding to the first DNN that is established for the first time, the AMF may add the sixth indication information to the request for establishing the first PDU session that is sent to the (SMF+PGW-C), and a request for establishing a PDU session that is not established for the first time carries no sixth indication information. After selecting the (UPF+PGW-U), the (SMF+PGW-C) stores a correspondence between the DNN and the (UPF+PGW-U). Next time the (SMF+PGW-C) receives a PDU session corresponding to the first DNN, the (SMF+PGW-C) selects a (UPF+PGW-U) same as that for the first PDU session.

Optionally, in another possible implementation of S603, the AMF may add the sixth indication information to each request for establishing a PDU session that is sent to the (SMF+PGW-C). In this way, each time a request for establishing a PDU session is received, the (SMF+PGW-C) searches a context of the PDU session based on a DNN to determine a PDU session having the same DNN, and determines a (UPF+PGW-U) selected for the established PDU session having the same DNN as a (UPF+PGW-U) for the current PDU session.

Optionally, in S604, the (SMF+PGW-C) selects a (UPF+PGW-U) for the PDU session that carries the first DNN and the first S-NSSAI. For a specific manner of selecting the (UPF+PGW-U), refer to S504 in the method 500.

Optionally, in a possible implementation of S603, if the first PDU session is a PDU session that carries the first DNN and the first S-NSSAI and that is established for the first time, the AMF may add the sixth indication information to the request for establishing the first PDU session that is sent to the (SMF+PGW-C), and a request for establishing a PDU session that is not established for the first time carries no sixth indication information. After selecting the (UPF+PGW-U), the (SMF+PGW-C) stores a correspondence between the first DNN, the first S-NSSAI, and the (UPF+PGW-U). Next time the (SMF+PGW-C) receives a PDU session that carries the first DNN and the first S-NSSAI, the (SMF+PGW-C) selects a (UPF+PGW-U) same as that for the first PDU session.

Optionally, in another possible implementation of S603, the AMF may add the sixth indication information to each request for establishing a PDU session that is sent to the (SMF+PGW-C). In this way, each time a request for establishing a PDU session is received, the (SMF+PGW-C) searches a context of the PDU session based on a DNN to determine a PDU session having the same DNN, and determines a (UPF+PGW-U) selected for the established PDU session having the first DNN and the first S-NSSAI as a (UPF+PGW-U) for the current PDU session.

S605. For a process of establishing the first PDU session by a terminal, a RAN, an AMF, an (SMF+PGW-C), a (UDM+HSS), a PCF, and a (UPF+PGW-U), refer to the other approaches. To avoid repetition, details are not described in this embodiment of this application.

It should be understood that, in the embodiments of this application, a sequence of steps in the foregoing method 200 to method 600 is not limited, and sequence numbers of steps in each method do not represent a sequence. In actual application, a sequence of steps in each method may be adjusted. For example, a sequence of steps in each method may be determined based on internal logic.

With reference to FIG. 2 to FIG. 6, the foregoing describes in detail the method for determining a PDU session service network element according to the embodiments of this application. With reference to FIG. 7 to FIG. 16, the following describes in detail an apparatus and a system for determining a PDU session service network element according to the embodiments of this application.

Figure 7:
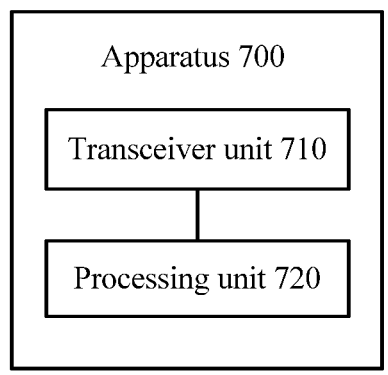
FIG. 7 is a schematic block diagram of an apparatus for determining a PDU session service network element according to an embodiment of this application.

FIG. 7 shows an apparatus 700 for determining a PDU session service network element according to an embodiment of this application. The apparatus 700 includes a transceiver unit 710 configured to receive a request for establishing a first PDU session from a mobility management device, where the request for establishing the first PDU session includes a first DNN, and a processing unit 720 configured to determine that a same control plane function network element and a same user plane function network element need to be selected for a PDU session corresponding to the first DNN, where the transceiver unit 710 is further configured to send first indication information to the mobility management device, where the first indication information is used to indicate that a same control plane function network element needs to be selected for the PDU session corresponding to the first DNN.

In an optional embodiment, the request for establishing the first PDU session further includes second indication information, and the second indication information is used to indicate that a same control plane function network element and a same user plane function network element need to be selected for a PDU session corresponding to the first DNN that is established by a terminal. The processing unit 720 is further configured to determine, according to the second indication information, that a same control plane function network element and a same user plane function network element need to be selected for the PDU session corresponding to the first DNN that is established by the terminal.

In an optional embodiment, the second indication information is SSC mode 1.

In an optional embodiment, the processing unit 720 is further configured to, before determining that a same control plane function network element and a same user plane function network element need to be selected for the PDU session corresponding to the first DNN, determine that the first PDU session needs to be subsequently switched to an EPC network.

In an optional embodiment, the processing unit 720 is further configured to, after determining that a same control plane function network element and a same user plane function network element need to be selected for the PDU session corresponding to the first DNN, allocate a user plane function network element to the first PDU session, and store a correspondence between the first DNN and the allocated user plane function network element.

In an optional embodiment, the transceiver unit 710 is further configured to receive a request for establishing a second PDU session that is sent by the mobility management device, where the request for establishing the second PDU session includes the first DNN, and the processing unit 720 is further configured to determine the user plane function network element for the first PDU session as a user plane function network element for the second PDU session.

In an optional embodiment, the request for establishing the first PDU session further includes first S-NSSAI, and the PDU session corresponding to the first DNN is a PDU session that carries the first DNN and the first S-NSSAI.

It should be understood that the apparatus 700 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described functions. In an optional example, a person skilled in the art may understand that the apparatus 700 may be the control plane function network element in the foregoing method embodiments, and the apparatus 700 may be configured to perform procedures and/or steps corresponding to the control plane function network element in the foregoing method embodiments. To avoid repetition, details are not described herein again.

Figure 8:
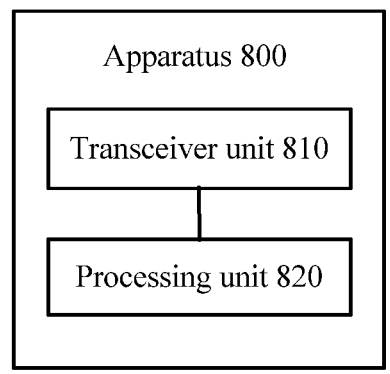
FIG. 8 is a schematic block diagram of another apparatus for determining a PDU session service network element according to an embodiment of this application.

FIG. 8 shows an apparatus 800 for determining a PDU session service network element according to an embodiment of this application. The apparatus 800 includes a transceiver unit 810 configured to receive a request for establishing a second PDU session that is sent by a terminal, where the request for establishing the second PDU session includes a first DNN, and a processing unit 820 configured to determine, based on a first correspondence set, that a first control plane function network element is a control plane function network element for the second PDU session, where the first correspondence set is used to indicate that a same specific control plane function network element needs to be selected for a plurality of PDU sessions that carry a specific DNN, and the first correspondence set includes a correspondence between the first DNN and the first control plane function network element, where the transceiver unit 810 is further configured to send the request for establishing the second PDU session to the first control plane function network element.

In an optional embodiment, the transceiver unit 810 is further configured to receive first indication information from the first control plane function network element, where the first indication information is used to indicate that a same control plane function network element needs to be selected for a PDU session corresponding to the first DNN. The processing unit 820 is further configured to store a correspondence between the first DNN and the first control plane function network element according to the first indication information.

In an optional embodiment, each element in the first correspondence set is used to indicate a correspondence between one DNN and one control plane function network element and whether a same control plane function network element needs to be selected for PDU sessions corresponding to one DNN.

In an optional embodiment, the request for establishing the second PDU session includes fifth indication information, and the fifth indication information is used to indicate that a same user plane function network element needs to be selected for a PDU session corresponding to the first DNN.

It should be understood that the apparatus 800 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described functions. In an optional example, a person skilled in the art may understand that the apparatus 800 may be the mobility management device in the foregoing method embodiments, and the apparatus 800 may be configured to perform procedures and/or steps corresponding to the mobility management device in the foregoing method embodiments. To avoid repetition, details are not described herein again.

Figure 9:
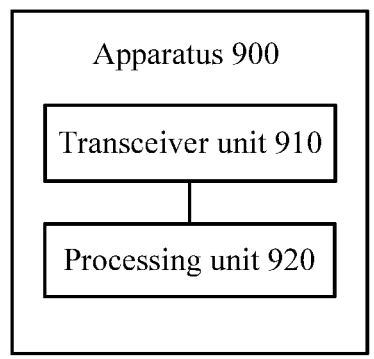
FIG. 9 is a schematic block diagram of still another apparatus for determining a PDU session service network element according to an embodiment of this application.

FIG. 9 shows an apparatus 900 for determining a PDU session service network element according to an embodiment of this application. The apparatus 900 includes a transceiver unit 910 configured to receive a request for establishing a first PDU session that is sent by a terminal, where the request for establishing the first PDU session includes a first DNN, and a processing unit 920 configured to determine that a same control plane function network element needs to be selected or a same control plane function network element and a same user plane function network element need to be selected for a PDU session corresponding to the first DNN, where the processing unit 920 is further configured to determine that a first control plane function network element is a control plane function network element for the first PDU session.

In an optional embodiment, the processing unit 920 is further configured to determine whether a PDU session with the same first DNN has been established, and when a PDU session with the same first DNN has been established, determine that the first control plane function network element is a control plane function network element for the established PDU session with the same first DNN.

In an optional embodiment, the request for establishing the first PDU session includes second indication information, and the second indication information is used to indicate that a same control plane function network element needs to be selected or a same control plane function network element and a same user plane function network element need to be selected for a PDU session corresponding to the first DNN that is established by the terminal. The processing unit is configured to determine, according to the second indication information, that a same control plane function network element needs to be selected or a same control plane function network element and a same user plane function network element need to be selected for the PDU session corresponding to the first DNN that is established by the terminal.

In an optional embodiment, the second indication information is SSC mode 1.

In an optional embodiment, if the processing unit 920 determines that a same control plane function network element and a same user plane function network element need to be selected for the PDU session corresponding to the first DNN, the transceiver unit 910 sends fifth indication information to the first control plane function network element, where the fifth indication information is used to indicate that the PDU session corresponding to the first DNN corresponds to a same user plane function network element.

In an optional embodiment, the request for establishing the first PDU session further includes first S-NSSAI, and the PDU session corresponding to the first DNN is a PDU session that carries the first DNN and the first S-NSSAI.

In an optional embodiment, the processing unit 920 is further configured to determine whether a PDU session that carries the first DNN and the first S-NSSAI has been established, and when a PDU session that carries the first DNN and the first S-NSSAI has been established, determine that the first control plane function network element is a control plane function network element for the established PDU session that has the same first DNN and first S-NSSAI.

It should be understood that the apparatus 900 herein is embodied in a form of functional units. The term "unit"

herein may be an ASIC, an electronic circuit, a processor (for example, a shared processor, a dedicated processor, or a group processor) configured to execute one or more software or firmware programs and a memory, a merged logic circuit, and/or another appropriate component that supports the described functions. In an optional example, a person skilled in the art may understand that the apparatus 900 may be the mobility management device in the foregoing method embodiments, and the apparatus 900 may be configured to perform procedures and/or steps corresponding to the mobility management device in the foregoing method embodiments. To avoid repetition, details are not described herein again.

Figure 10:
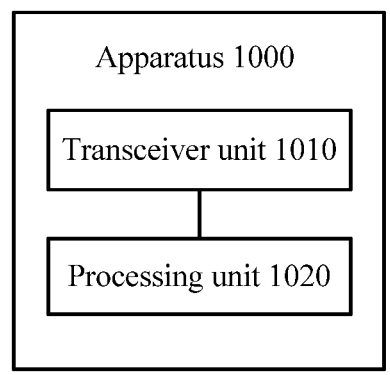
FIG. 10 is a schematic block diagram of still another apparatus for determining a PDU session service network element according to an embodiment of this application.

FIG. 10 shows an apparatus 1000 for determining a PDU session service network element according to an embodiment of this application. The apparatus 1000 includes a transceiver unit 1010 configured to receive a request for establishing a first PDU session that is sent by a mobility management device, where the request for establishing the first PDU session includes a first DNN, and a processing unit 1020 configured to determine that a same user plane function network element needs to be selected for a PDU session corresponding to the first DNN, where the processing unit 1020 is further configured to determine that a first user plane function network element is a user plane function network element for the first PDU session.

In an optional embodiment, the processing unit 1020 is further configured to determine whether a PDU session with the same first DNN has been established, and when a PDU session with the same first DNN has been established, determine that the first user plane function network element is a user plane function network element for the established PDU session with the same first DNN.

In an optional embodiment, the request for establishing the first PDU session includes second indication information, and the second indication information is used to indicate that a same user plane function network element needs to be selected for the PDU session corresponding to the first DNN that is established by the terminal.

The processing unit 1020 is configured to determine, according to the second indication information, that a same user plane function network element needs to be selected for the PDU session corresponding to the first DNN.

In an optional embodiment, the second indication information is SSC mode 1.

In an optional embodiment, the request for establishing the first PDU session further includes first S-NSSAI, and the PDU session corresponding to the first DNN is a PDU session that carries the first DNN and the first S-NSSAI.

In an optional embodiment, the processing unit 1020 is further configured to determine whether a PDU session that carries the first DNN and the first S-NSSAI has been established, and when a PDU session that carries the first DNN and the first S-NSSAI has been established, determine that the first user plane function network element is a user plane function network element for the established PDU session that has the same first DNN and first S-NSSAI.

In an optional embodiment, the processing unit 1020 is further configured to, before determining that a same control plane function network element and a same user plane function network element need to be selected for the PDU session corresponding to the first DNN, determine that the first PDU session needs to be subsequently switched to an EPC network.

It should be understood that the apparatus 1000 herein is embodied in a form of functional units. The term "unit" herein may be an ASIC, an electronic circuit, a processor (for example, a shared processor, a dedicated processor, or a group processor) configured to execute one or more software or firmware programs and a memory, a merged logic circuit, and/or another appropriate component that supports the described functions. In an optional example, a person skilled in the art may understand that the apparatus 1000 may be the control plane function network element in the foregoing method embodiments, and the apparatus 1000 may be configured to perform procedures and/or steps corresponding to the control plane function network element in the foregoing method embodiments. To avoid repetition, details are not described herein again.

Figure 11:
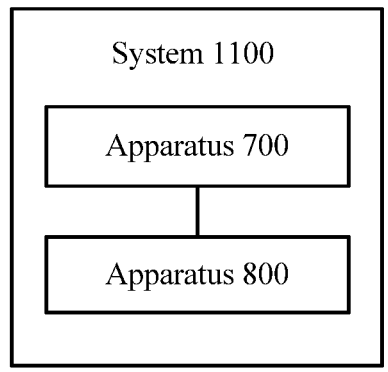
FIG. 11 is a schematic block diagram of a system for determining a PDU session service network element according to an embodiment of this application.
Figure 12:
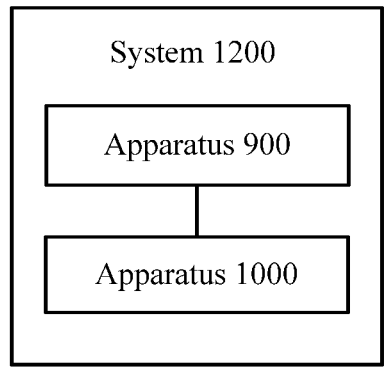
FIG. 12 is a schematic block diagram of another system for determining a PDU session service network element according to an embodiment of this application.

FIG. 11 shows a communications system 1100 according to an embodiment of this application. The system 1100 includes an apparatus 700 and an apparatus 800. FIG. 12 shows a communications system 1200 according to an embodiment of this application. The system 1200 includes an apparatus 900 and an apparatus 1000.

The apparatus 700 is completely corresponding to the control plane function network element in the embodiments of the method 200 and the method 400. The apparatus 800 is completely corresponding to the mobility management device in the embodiments of the method 200 and the method 400. The apparatus 900 is completely corresponding to the mobility management device in the embodiment of the method 300, the method 500, or the method 600. The apparatus 1000 is completely corresponding to the control plane function network element in the embodiment of the method 300, the method 500, or the method 600. Corresponding steps are performed by corresponding units. For example, the transceiver unit performs the sending and receiving steps in the method embodiments, and other steps except sending and receiving may be performed by the processing unit. For a function of a specific unit, refer to a corresponding method embodiment. Details are not described again.

The apparatuses 700 to 1000 in the foregoing solutions have functions of implementing corresponding steps performed by the control plane function network element and the mobility management network element in the foregoing methods. The functions may be implemented using hardware, or may be implemented by executing corresponding software using hardware. The hardware or the software includes one or more modules corresponding to the foregoing functions. For example, a sending unit may be replaced with a transmitter, a receiving unit may be replaced with a receiver, and another unit such as a determining unit may be replaced with a processor in order to respectively perform a sending operation, a receiving operation, and a related processing operation in each method embodiment.

In the embodiments of this application, the apparatuses in FIG. 7 to FIG. 10 may be alternatively chips or chip systems, such as a system on chip (SoC). Correspondingly, the receiving unit and the sending unit may be a transceiver circuit of the chip. This is not limited herein.

Figure 13:
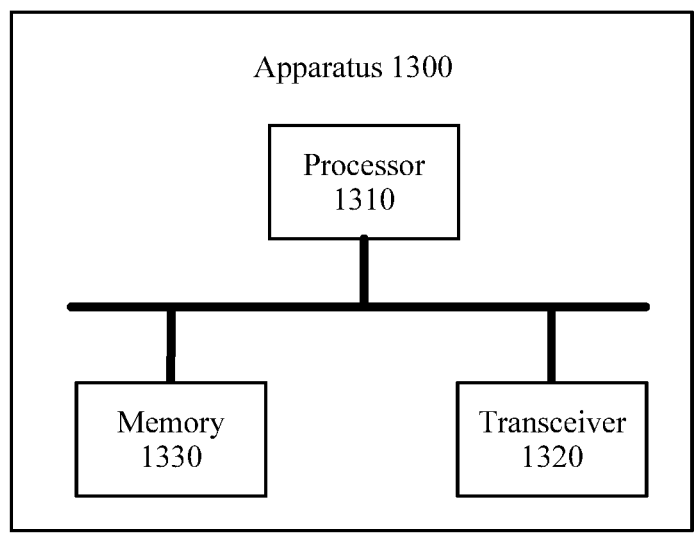
FIG. 13 is a schematic block diagram of still another apparatus for determining a PDU session service network element according to an embodiment of this application.

FIG. 13 shows still another apparatus 1300 for determining a PDU session service network element according to an embodiment of this application. The apparatus 1300 includes a processor 1310, a transceiver 1320, and a memory 1330. The processor 1310, the transceiver 1320, and the memory 1330 communicate with each other through an internal connection channel. The memory 1330 is configured to store an instruction. The processor 1310 is configured to execute the instruction stored in the memory 1330, to control the transceiver 1320 to send a signal and/or receive a signal.

The transceiver 1320 is configured to receive a request for establishing a first PDU session from a mobility management device, where the request for establishing the first PDU session includes a first DNN. The processor 1310 is configured to determine that a same control plane function network element and a same user plane function network element need to be selected for a PDU session corresponding to the first DNN.

The transceiver 1320 is further configured to send first indication information to the mobility management device, where the first indication information is used to indicate that a same control plane function network element needs to be selected for the PDU session corresponding to the first DNN.

Figure 14:
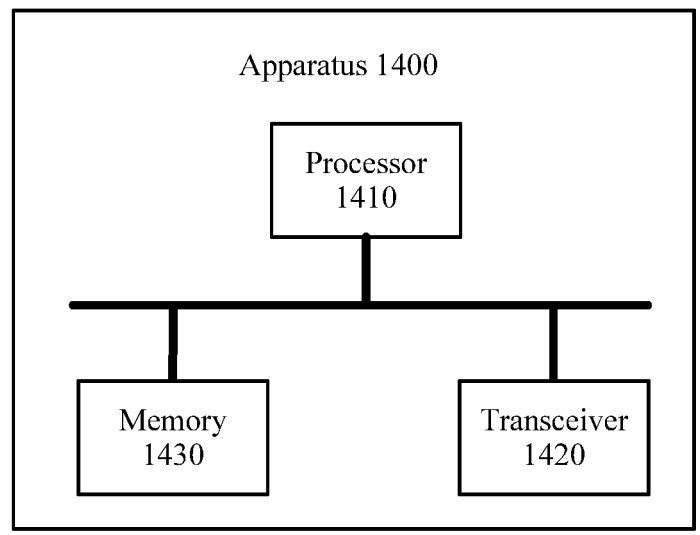
FIG. 14 is a schematic block diagram of still another apparatus for determining a PDU session service network element according to an embodiment of this application.

It should be understood that the apparatus 1300 may be the control plane function network element in the foregoing method embodiments, and may be configured to perform steps and/or procedures corresponding to the control plane function network element in the foregoing method embodiments. Optionally, the memory 1330 may include a read-only memory (ROM) and a random-access memory (RAM), and provide an instruction and data for the processor. A part of the memory may further include a non-volatile RAM (NVRAM). For example, the memory may further store information of a device type. The processor 1310 may be configured to execute the instruction stored in the memory. In addition, when the processor 1310 executes the instruction stored in the memory, the processor 1310 is configured to perform the steps and/or the procedures corresponding to the control plane function network element in the foregoing method embodiments. FIG. 14 shows still another apparatus 1400 for determining a PDU session service network element according to an embodiment of this application. The apparatus 1400 includes a processor 1410, a transceiver 1420, and a memory 1430. The processor 1410, the transceiver 1420, and the memory 1430 communicate with each other through an internal connection channel. The memory 1430 is configured to store an instruction. The processor 1410 is configured to execute the instruction stored in the memory 1430, to control the transceiver 1420 to send a signal and/or receive a signal.

The transceiver 1420 is configured to receive a request for establishing a second PDU session that is sent by a terminal, where the request for establishing the second PDU session carries a first DNN. The processor 1410 is configured to determine, based on a first correspondence set, that a first control plane function network element is a control plane function network element for the second PDU session, where the first correspondence set is used to indicate that a same specific control plane function network element needs to be selected for a plurality of PDU sessions that carry a specific DNN. The first correspondence set includes a correspondence between the first DNN and the first control plane function network element. The transceiver 1420 is further configured to send the request for establishing the second PDU session to the first control plane function network element.

It should be understood that the apparatus 1400 may be the mobility management device in the foregoing method embodiments, and may be configured to perform steps and/or procedures corresponding to the mobility management device in the foregoing method embodiments. Optionally, the memory 1430 may include a ROM and a RAM, and provide an instruction and data for the processor. A part of the memory may further include an NVRAM. For example, the memory may further store information of a device type. The processor 1410 may be configured to execute the instruction stored in the memory. In addition, when the processor 1410 executes the instruction stored in the memory, the processor 1410 is configured to perform the steps and/or the procedures corresponding to the mobility management device in the foregoing method embodiments.

Figure 15:
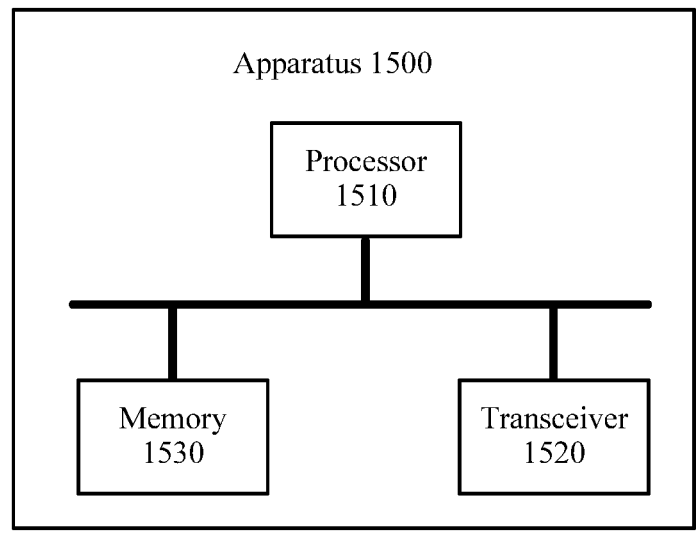
FIG. 15 is a schematic block diagram of still another apparatus for determining a PDU session service network element according to an embodiment of this application.

FIG. 15 shows still another apparatus 1500 for determining a PDU session service network element according to an embodiment of this application. The apparatus 1500 includes a processor 1510, a transceiver 1520, and a memory 1530. The processor 1510, the transceiver 1520, and the memory 1530 communicate with each other through an internal connection channel. The memory 1530 is configured to store an instruction. The processor 1510 is configured to execute the instruction stored in the memory 1530, to control the transceiver 1520 to send a signal and/or receive a signal.

The transceiver 1520 is configured to receive a request for establishing a first PDU session that is sent by a terminal, where the request for establishing the first PDU session includes a first DNN. The processor 1510 is configured to determine that a same control plane function network element needs to be selected or a same control plane function network element and a same user plane function network element need to be selected for a PDU session corresponding to the first DNN. The processor 1510 is further configured to determine that a first control plane function network element is a control plane function network element for the first PDU session.

It should be understood that the apparatus 1500 may be the mobility management device in the foregoing method embodiments, and may be configured to perform steps and/or procedures corresponding to the mobility management device in the foregoing method embodiments. Optionally, the memory 1530 may include a ROM and a RAM, and provide an instruction and data for the processor. A part of the memory may further include an NVRAM. For example, the memory may further store information of a device type. The processor 1510 may be configured to execute the instruction stored in the memory. In addition, when the processor 1510 executes the instruction stored in the memory, the processor 1510 is configured to perform the steps and/or the procedures corresponding to the mobility management device in the foregoing method embodiments.

Figure 16:
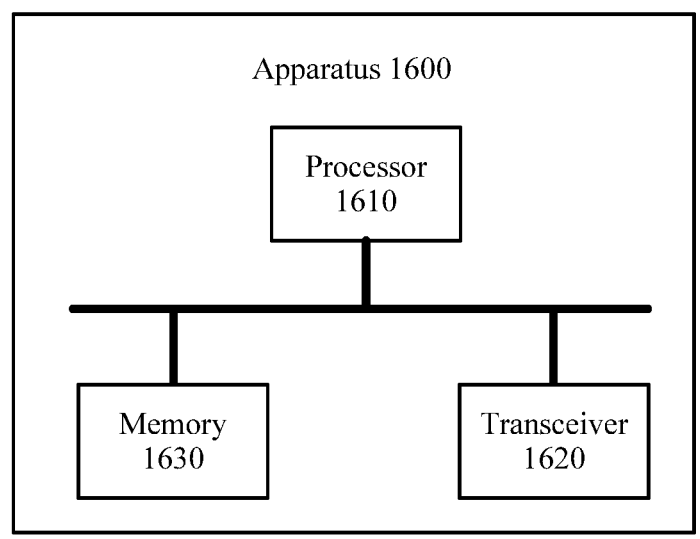
FIG. 16 is a schematic block diagram of still another apparatus for determining a PDU session service network element according to an embodiment of this application.

FIG. 16 shows still another apparatus 1600 for determining a PDU session service network element according to an embodiment of this application. The apparatus 1600 includes a processor 1610, a transceiver 1620, and a memory 1630. The processor 1610, the transceiver 1620, and the memory 1630 communicate with each other through an internal connection channel. The memory 1630 is configured to store an instruction. The processor 1610 is configured to execute the instruction stored in the memory 1630, to control the transceiver 1620 to send a signal and/or receive a signal.

The transceiver 1620 is configured to receive a request for establishing a first PDU session that is sent by a mobility management device, where the request for establishing the first PDU session includes a first DNN. The processor 1610 is configured to determine that a same user plane function network element needs to be selected for a PDU session corresponding to the first DNN. The processor 1610 is further configured to determine that a first user plane function network element is a user plane function network element for the first PDU session.

It should be understood that the apparatus 1600 may be the control plane function network element in the foregoing method embodiments, and may be configured to perform steps and/or procedures corresponding to the control plane function network element in the foregoing method embodiments. Optionally, the memory 1630 may include a ROM and a RAM, and provide an instruction and data for the processor. A part of the memory may further include an NVRAM. For example, the memory may further store information of a device type. The processor 1610 may be configured to execute the instruction stored in the memory. In addition, when the processor 1610 executes the instruction stored in the memory, the processor 1610 is configured to perform the steps and/or the procedures corresponding to the control plane function network element in the foregoing method embodiments.

It should be understood that the transceiver may include a transmitter and a receiver. The transceiver may further include an antenna. There may be one or more antennas. The memory may be an independent device, or may be integrated into the processor. All or some of the foregoing components may be integrated into a chip for implementation, for example, integrated into a baseband chip for implementation.

In the embodiments of this application, the transceiver in FIG. 13 to FIG. 16 may be alternatively a communications interface. This is not limited herein.

In the embodiments of this application, the control plane function network element may be a physical entity device, or may be a virtual function network element. This is not limited herein.

In the embodiments of this application, for ease of understanding, a plurality of examples is used for description. However, these examples are merely examples, and it does not mean that these examples are best implementations for implementing this application.

In the embodiments of this application, for ease of description, names of a request message, a response message, and various other messages are used. However, these messages are merely used as an example to describe content that needs to be carried or an implemented function. A specific name of a message constitutes no limitation to this application. For example, the messages may be a first message, a second message, and a third message. These messages may be specific messages, or may be some fields in the messages. These messages may also represent various service operations.

It should be understood that, the processor in the foregoing apparatus in the embodiments of this application may be a central processing unit (CPU), or may be another general purpose processor, a digital signal processor (DSP), an ASIC, a field programmable gate array (FPGA) or another programmable logic device, a discrete gate or transistor logic device, a discrete hardware component, or the like. The general purpose processor may be a microprocessor, or the processor may be any conventional processor or the like.

In an implementation process, steps in the foregoing methods may be implemented using a hardware integrated logic circuit in the processor, or using instructions in a form of software. The steps of the methods disclosed with reference to the embodiments of this application may be directly performed by a hardware processor, or may be performed using a combination of hardware in the processor and a software unit. The software unit may be located in a mature storage medium in the art, such as a RAM, a flash memory, a ROM, a programmable ROM (PROM), an electrically erasable PROM (EEPROM), or a register. The storage medium is located in the memory, and a processor executes instructions in the memory and performs the steps in the foregoing methods in combination with hardware of the processor. To avoid repetition, details are not described herein again.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus.

The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner.

The computer readable storage medium may be any usable medium accessible to a computer, or a data storage device, such as a server or a data center, integrating one or more usable media. The usable medium may be a magnetic medium (for example, a FLOPPY DISK, a hard disk, or a magnetic tape), an optical medium (for example, digital versatile disc (DVD)), or a semiconductor medium (for example, a solid state disk (SSD)), or the like.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a protocol data unit (PDU) session service network element, wherein the method comprises:
    receiving, by a first control plane function network element from a first mobility management device, a request for establishing a first PDU session, wherein the request comprises a first data network name (DNN) that the first PDU session is to be connected;
    determining, by the first control plane function network element based on the first DNN that the first PDU session is to be connected, to select a first user plane function network element for the first PDU session; and
    selecting, by the first control plane function network element for the first PDU session, the first user plane function network element, wherein the first user plane function network element is for serving an established PDU session connected to the first DNN.

2. The method of claim 1, further comprising:
    receiving, by the first mobility management device, the request from a terminal;
    determining, by the first mobility management device according to the first DNN, the first control plane function network element; and
    sending, by the first mobility management device, the request to the first control plane function network element.

3. The method of claim 2, further comprising determining, by the first mobility management device, to select a same control plane function network element for PDU sessions with the first DNN.

4. The method of claim 3, wherein the first control plane function network element is a control plane function network element that serves the established PDU session.

5. The method of claim 1, wherein the request further comprises first single network slice selection assistance information (S-NSSAI), and wherein the established PDU session is associated with the first DNN and the first S-NSSAI.

6. The method of claim 1, further comprising determining, by the first control plane function network element, to switch the first PDU session to an Evolved Packet Core (EPC) network.

7. The method of claim 1, wherein determining to select the first user plane function network element for the first PDU session with the first DNN comprises determining, by the first control plane function network element based on subscription data, to select the first user plane function network element as a same user plane function network element for serving all PDU sessions with the first DNN.

8. The method of claim 7, wherein the subscription data indicates the first PDU to be switched to an Evolved Packet Core (EPC) network.

9. The method of claim 1, further comprising:
    receiving, by the first mobility management device, the request from a terminal; and
    sending, by the first mobility management device, the request for establishing the first PDU session to a first control plane function network element.

10. A communications system comprising:
    a mobility management device configured to:
        receive a request for establishing a first protocol data unit (PDU) session from a terminal, wherein the request comprises a first data network name (DNN) that the first PDU session is to be connected; and
        send the request; and
    a first control plane function network element configured to:
        receive the request from the mobility management device;
        determine, based on the first DNN that the first PDU session is to be connected, to select a first user plane function network element for the first PDU session; and
        select, for the first PDU session, the first user plane function network element, wherein the first user plane function network element is for serving an established PDU session connected to the first DNN.

11. The communications system of claim 10, wherein the mobility management device is further configured to determine to select a same control plane function network element for PDU sessions with the first DNN.

12. The communications system of claim 10, wherein the first control plane function network element is a control plane function network element that serves the established PDU session.

13. The communications system of claim 10, wherein the request further comprises first single network slice selection assistance information (S-NSSAI), and wherein the established PDU session is associated with the first DNN and the first S-NSSAI.

14. The communications system of claim 10, wherein the first control plane function network element is further configured to determine to switch the first PDU session to an Evolved Packet Core (EPC) network.

15. The communications system of claim 10, wherein the first control plane function network element is further configured to determine, based on subscription data, to select the first user plane function network element as a same user plane function network element for serving all PDU sessions with the first DNN.

16. The communications system of claim 15, wherein the subscription data indicates the first PDU to be switched to an Evolved Packet Core (EPC) network.

17. An apparatus, comprising:
- at least one processor; and
- a memory coupled to the at least one processor and having program instructions stored thereon which, when executed by the at least one processor, cause the apparatus to:
  - receive, from a first mobility management device, a request for establishing a first protocol data unit (PDU) session, wherein the request comprises a first data network name (DNN) that the first PDU session is to be connected;
  - determine, based on the first DNN that the first PDU session to be connected, to select a first user plane function network element for the first PDU session; and
  - select, for the first PDU session, the first user plane function network element, wherein the first user plane function network element is for serving an established PDU session connected to the first DNN.

18. The apparatus of claim 17, wherein the request further comprises first single network slice selection assistance information (S-NSSAI), and wherein the established PDU session is associated with the first DNN and the first S-NSSAI.

19. The apparatus of claim 17, wherein the program instructions further cause the apparatus to determine, based on subscription data, to select the first user plane function network element as a same user plane function network element for serving all PDU sessions with the first DNN.

20. The apparatus of claim 19, wherein the subscription data indicates the first PDU to be switched to an Evolved Packet Core (EPC) network.

* * * * *